United States Patent
Karube

(10) Patent No.: US 10,776,910 B2
(45) Date of Patent: Sep. 15, 2020

(54) CRACK INFORMATION EDITING DEVICE, METHOD OF EDITING CRACK INFORMATION, AND CRACK INFORMATION EDITING PROGRAM

(71) Applicant: FUJIFILM Corporation, Tokyo (JP)

(72) Inventor: Mikihiko Karube, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 106 days.

(21) Appl. No.: 16/010,611

(22) Filed: Jun. 18, 2018

(65) Prior Publication Data

US 2018/0300874 A1 Oct. 18, 2018

Related U.S. Application Data

(63) Continuation of application No. PCT/JP2017/000502, filed on Jan. 10, 2017.

(30) Foreign Application Priority Data

Jan. 22, 2016 (JP) .................... 2016-010709

(51) Int. Cl.
  *G06K 9/00* (2006.01)
  *G06T 7/00* (2017.01)
  (Continued)

(52) U.S. Cl.
  CPC ....... *G06T 7/0006* (2013.01); *G01N 21/8851* (2013.01); *G06T 7/0004* (2013.01);
  (Continued)

(58) Field of Classification Search
  CPC .................................................. G06T 7/0006
  (Continued)

(56) References Cited

U.S. PATENT DOCUMENTS

2008/0247636 A1* 10/2008 Davis ............... G06T 19/00
  382/152
2010/0082576 A1* 4/2010 Walker ............. G06F 16/958
  707/706
(Continued)

FOREIGN PATENT DOCUMENTS

CN  104063368 A   9/2014
JP  H07-111735   11/1995
(Continued)

OTHER PUBLICATIONS

International Search Report issued in PCT/JP2017/000502; dated Apr. 4, 2017.
(Continued)

*Primary Examiner* — Stephen P Coleman
(74) *Attorney, Agent, or Firm* — Studebaker & Brackett PC

(57) ABSTRACT

A hierarchical structure information generation unit 112 corrects hierarchical structure information based on an editing instruction input by a user through an operation unit (120) (step S160: editing step). A display of the hierarchical structure information is updated based on the editing instruction input. The editing instruction input includes deleting a damage vector corresponding to a randomly selected label, combining a plurality of discontinuous damage vectors associated with a plurality of randomly selected labels into one continuous damage vector, releasing the combination between the plurality of the damage vectors, and selection of a label corresponding to a vector group, and deletion, combination, and release of the combination of the vector group corresponding to the selected label.

11 Claims, 23 Drawing Sheets

(51) Int. Cl.
    *G06T 7/60* (2017.01)
    *G01N 21/88* (2006.01)
(52) U.S. Cl.
    CPC .......... *G06T 7/60* (2013.01); *G01N 2021/888* (2013.01); *G06T 2207/10016* (2013.01); *G06T 2207/20096* (2013.01); *G06T 2207/30132* (2013.01)
(58) Field of Classification Search
    USPC ....................................................... 382/108
    See application file for complete search history.

(56) References Cited

U.S. PATENT DOCUMENTS

| | | | | |
|---|---|---|---|---|
| 2015/0029180 | A1* | 1/2015 | Komatsu | G06T 19/006 345/419 |
| 2015/0351682 | A1 | 12/2015 | Yamanashi et al. | |
| 2016/0018341 | A1* | 1/2016 | Harvill | G01B 11/303 356/240.1 |

FOREIGN PATENT DOCUMENTS

| JP | 2002-174601 A | 6/2002 |
|---|---|---|
| JP | 2002-257744 A | 9/2002 |
| JP | 4006007 B2 | 11/2007 |
| JP | 2011-242365 A | 12/2011 |
| JP | 2014-006222 A | 1/2014 |
| JP | 2015-138467 A | 7/2015 |
| JP | 2015-232746 A | 12/2015 |
| JP | 2016-050887 A | 4/2016 |

OTHER PUBLICATIONS

International Preliminary Report on Patentability and Written Opinion issued in PCT/JP2017/000502; dated Jul. 24, 2018.

Extended European Search Report issued by the European Patent Office dated Dec. 5, 2018, which corresponds to EP17741247.5-1210 and is related to U.S. Appl. No. 16/010,611.

Alessio Arena et al., "A new computational approach to cracks quantification from 2D image analysis: Application to micro-cracks description in rocks", Computers & Geosciences, vol. 66, Jan. 28, 2014, pp. 106-120.

An Office Action issued by the State Intellectual Property Office of the People's Republic of China on Apr. 23, 2020, which corresponds to Chinese Patent Application No. 201780007573.9 and is related to U.S. Appl. No. 16/010,611 with English language translation.

* cited by examiner

FIG. 9

| VECTOR GROUP ID | IMAGE ID | IMAGE DATA | ACQUISITION DATE AND TIME | WIDTH OF IMAGE (pixel) | HEIGHT OF IMAGE (pixel) | THE NUMBER OF CHANNELS | BIT/PIXEL | RESOLUTION (mm/PIXEL) | |
|---|---|---|---|---|---|---|---|---|---|
| | | | | | | | | X DIRECTION | Y DIRECTION |
| C1 | img_2015-001 | (IMAGE DATA OF img_2015-001) | 12.18.2015 | 5,000 | 3,500 | 3 | 64 | 0.5 | 0.5 |

FIG. 10

| VECTOR GROUP ID | DAMAGE VECTOR INFORMATION ||||||||||||| INSPECTION DATE | REPAIR ||
|---|---|---|---|---|---|---|---|---|---|---|---|---|---|---|---|
| | VECTOR ID | HIERARCHY (LEVEL) | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | | TYPE | REPAIR DATE |
| | | | POINT NUMBER | COORDINATE | POINT NUMBER | COORDINATE | | | | | | | | | | |
| C1 | C1-1 | LEVEL 1 | P1 | (X1,Y1) | P2 | (X2,Y2) | 100 | 1 | 0 | 0 | - | - | C1-2<br>C1-3 | 12.18.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5<br>C1-6 | 12.18.2015 | R2 | 9.28.2015 |
| | C1-4 | LEVEL 2 | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 12.18.2015 | R3 | 9.28.2015 |

FIG. 13

| VECTOR GROUP ID | DAMAGE VECTOR INFORMATION ||||||||||||||||
|---|---|---|---|---|---|---|---|---|---|---|---|---|---|---|---|---|
| | VECTOR ID | HIERARCHY (LEVEL) | TYPE | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | INSPECTION DATE | REPAIR ||
| | | | | POINT NUMBER | COORDINATE | POINT NUMBER | COORDINATE | | | | | | | | | TYPE | REPAIR DATE |
| C1 | C1-1 | LEVEL 1 | TRUNK | P1 | (X1,Y1) | P2 | (X2,Y2) | 100 | 1 | 0 | 0 | - | - | C1-2 C1-3 | 12.18.2015 | R1 | 9.28.2015 |
| | C1-2 | LEVEL 2 | BRANCH | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | BRANCH | P2 | (X2,Y2) | P4 | (X4,Y4) | 30 | 0.5 | 0 | 0 | C1-1 | C1-2 | C1-5 C1-6 | 12.18.2015 | R2 | 9.28.2015 |
| | C1-4 | LEVEL 2 | BRANCH | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | LEAF | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | LEAF | P4 | (X4,Y4) | P7 | (X7,Y7) | 25 | 0.1 | 0 | 0 | C1-3 | C1-5 | - | 12.18.2015 | R3 | 9.28.2015 |

FIG. 17

| VECTOR GROUP ID | DAMAGE VECTOR INFORMATION ||||||||||||||
|---|---|---|---|---|---|---|---|---|---|---|---|---|---|---|
| | VECTOR ID | HIERARCHY (LEVEL) | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | INSPECTION DATE | REPAIR ||
| | | | POINT NUMBER | COORDINATE | POINT NUMBER | COORDINATE | | | | | | | | | TYPE | REPAIR DATE |
| C1 | C1-1 | LEVEL 1 | P1 | (X1,Y1) | P2 | (X2,Y2) | 100 | 1 | 0 | 0 | - | - | C1-2 C1-3 | 3.1.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 6.1.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5 C1-6 | 6.1.2015 | R2 | 9.28.2015 |
| | C1-4 | LEVEL 3 | P3 | (X3,Y3) | P5 | (X5,Y5) | 60 | 1 | 0 | 0 | C1-2 | - | - | 9.1.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 9.1.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 9.1.2015 | R3 | 9.28.2015 |

FIG. 19

| VECTOR GROUP ID | DAMAGE VECTOR INFORMATION |||||||||||||||
|---|---|---|---|---|---|---|---|---|---|---|---|---|---|---|---|
| | VECTOR ID | HIERARCHY (LEVEL) | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | INSPECTION DATE | REPAIR ||
| | | | POINT NUMBER | COORDINATE | POINT NUMBER | COORDINATES | | | | | | | | | TYPE | REPAIR DATE |
| C2 | C2-1 | LEVEL 1 | P8 | (X8,Y8) | P9 | (X9,Y9) | 100 | 1 | 0 | 0 | - | - | C2-2 | 12.18.2015 | R1 | 9.28.2015 |
| | C2-2 | LEVEL 1 | P9 | (X9,Y9) | P10 | (X10,Y10) | 120 | 1 | 0 | 0 | C2-1 | - | C2-3 | 12.18.2015 | R1 | 9.28.2015 |
| | C2-3 | LEVEL 1 | P10 | (X10,Y10) | P11 | (X11,Y11) | 100 | 0.5 | 0 | 0 | C2-2 | - | C2-4 | 12.18.2015 | R1 | 9.28.2015 |
| | C2-4 | LEVEL 1 | P11 | (X11,Y11) | P12 | (X12,Y12) | 110 | 1 | 0 | 0 | C2-3 | - | - | 12.18.2015 | R1 | 9.28.2015 |

FIG. 22

| VECTOR GROUP ID | DAMAGE VECTOR INFORMATION ||||||||||||||
| --- | --- | --- | --- | --- | --- | --- | --- | --- | --- | --- | --- | --- | --- | --- |
| | VECTOR ID | HIERARCHY (LEVEL) | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | INSPECTION DATE | REPAIR ||
| | | | POINT NUMBER | COORDINATE | POINT NUMBER | COORDINATE | | | | | | | | | TYPE | REPAIR DATE |
| C1 | C1-1 | LEVEL 1 | P1 | (X1,Y1) | P2 | (X2,Y2) | 100 | 1 | 0 | 0 | - | - | C1-2<br>C1-3 | 12.18.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 12.18.2015 | R1 | 9.28.2015 |
| | C1-3 | LEVEL 2 | P2 | (X2,Y2) | P4 | (X4,Y4) | 30 | 0.5 | 1 | 0 | C1-1 | C1-2 | C1-5<br>C1-6 | 12.18.2015 | R2 | 9.28.2015 |
| | C1-4 | LEVEL 2 | P3 | (X3,Y3) | P5 | (X5,Y5) | 60 | 1 | 0 | 0 | C1-2 | - | - | 12.18.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 12.18.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 12.18.2015 | R3 | 9.28.2015 |

FIG. 25

| VECTOR GROUP ID | DAMAGE VECTOR INFORMATION ||||||||||||||
| --- | --- | --- | --- | --- | --- | --- | --- | --- | --- | --- | --- | --- | --- | --- |
| | VECTOR ID | HIERARCHY (LEVEL) | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | INSPECTION DATE | REPAIR ||
| | | | POINT NUMBER | COORDINATE | POINT NUMBER | COORDINATE | | | | | | | | | TYPE | REPAIR DATE |
| C1 | C1-1 | LEVEL 1 | P1 | (X1,Y1) | P2 | (X2,Y2) | 100 | 1 | 0 | 0 | - | - | C1-2 C1-3 | 3.1.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 6.1.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5 C1-6 | 6.1.2015 | R2 | 9.28.2015 |
| | C1-4 | LEVEL 3 | P3 | (X3,Y3) | P5 | (X5,Y5) | 60 | 1 | 0 | 0 | C1-2 | - | - | 9.1.2015 | R2 | 9.28.2015 |
| | C1-5 | LEVEL 3 | P4 | (X4,Y4) | P6 | (X6,Y6) | 25 | 0.1 | 0 | 2 | C1-3 | C1-6 | C1-5 +C8-1 | 9.1.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 9.1.2015 | R3 | 9.28.2015 |
| C8 | C8-1 | LEVEL 1 | P17 | ... | P18 | ... | ... | ... | 0 | 2 | C1-5 +C8-1 | ... | C8-2 C8-3 | ... | ... | ... |
| ... | ... | ... | ... | ... | ... | ... | ... | ... | ... | ... | ... | ... | ... | ... | ... | ... |

FIG. 28

| VECTOR GROUP ID | DAMAGE VECTOR INFORMATION ||||||||||||| INSPECTION DATE | REPAIR ||
|---|---|---|---|---|---|---|---|---|---|---|---|---|---|---|---|---|
| | VECTOR ID | HIERARCHY (LEVEL) | START POINT || END POINT || LENGTH (mm) | WIDTH (mm) | DELETE OPERATION FLAG | ADD OPERATION FLAG | PARENT VECTOR ID | SIBLING VECTOR ID | CHILD VECTOR ID | | TYPE | REPAIR DATE |
| | | | POINT NUMBER | COORDINATE | POINT NUMBER | COORDINATE | | | | | | | | | | |
| C1 | C1-1 | LEVEL 1 | P1 | (X1,Y1) | P2 | (X2,Y2) | 100 | 1 | 0 | 0 | - | - | C1-2 C1-3 | 3.1.2015 | R1 | 9.28.2015 |
| | C1-2 | LEVEL 2 | P2 | (X2,Y2) | P3 | (X3,Y3) | 50 | 1 | 0 | 0 | C1-1 | C1-3 | C1-4 | 6.1.2015 | R1 | 9.28.2015 |
| | C1-3 | LEVEL 2 | P2 | (X2,Y2) | P4 | (X4,Y4) | 30 | 0.5 | 0 | 0 | C1-1 | C1-2 | C1-5 C1-6 | 6.1.2015 | R2 | 9.28.2015 |
| | C1-4 | LEVEL 3 | P3 | (X3,Y3) | P5 | (X5,Y5) | 60 | 1 | 0 | 0 | C1-2 | - | - | 9.1.2015 | R2 | 9.28.2015 |
| | C1-5 | LEVEL 3 | P4 | (X4,Y4) | P6 | (X6,Y6) | 25 | 0.1 | 0 | 0 | C1-3 | C1-6 | - | 9.1.2015 | R3 | 9.28.2015 |
| | C1-6 | LEVEL 3 | P4 | (X4,Y4) | P7 | (X7,Y7) | 25 | 0.1 | 0 | 0 | C1-3 | C1-5 | - | 9.1.2015 | R3 | 9.28.2015 |
| C8 | C8-1 | LEVEL 1 | P17 | ... | P18 | ... | ... | ... | ... | ... | - | - | C8-2 C8-3 | ... | ... | ... |
| ... | ... | ... | ... | ... | ... | ... | ... | ... | ... | ... | ... | ... | ... | ... | ... | ... |

CRACK INFORMATION EDITING DEVICE, METHOD OF EDITING CRACK INFORMATION, AND CRACK INFORMATION EDITING PROGRAM

CROSS-REFERENCE TO RELATED APPLICATIONS

The present application is a Continuation of PCT International Application No. PCT/JP2017/000502 filed on Jan. 10, 2017 claiming priority under 35 U.S.C § 119(a) to Japanese Patent Application No. 2016-10709 filed on Jan. 22, 2016. Each of the above applications is hereby expressly incorporated by reference, in their entirety, into the present application.

BACKGROUND OF THE INVENTION

1. Field of the Invention

The present invention relates to a crack information editing device, a method of editing crack information, and a crack information editing program, and particularly to the crack information editing device, the method of editing crack information, and the crack information editing program for editing crack information relating to a crack in a structure.

2. Description of the Related Art

Various kinds of damage are generated in structures such as a bridge, a tunnel, a road, and a building, and the damage increases with time. Therefore, it is necessary to repair the damage according to a damage situation in order to ensure safety of the structure. In the related art, the damage is inspected by a visual observation by a worker or using an instrument. However, in recent years, electronic processing by an imaging device and/or an image processing device is employed due to problems such as an inspection time, a cost, and an environment of a workplace.

According to JP2011-242365A, a crack detection device selects a feature amount relating to a pixel value and calculates neural network convergence to generate a crack candidate image. In crack determination on the candidate image, determination of the crack candidate image and connection determination of a pixel existing within a near range of the crack candidate image are performed. A determination is also made that it is a distant region and not the crack based on a Euclidean distance of an adjacent pixel.

The JP2002-174601A discloses labeling processing in which the same label (number) is assigned to a block of connected black pixels (or white pixels) and different labels (numbers) are assigned to different connected components. Accordingly, it is possible to divide a region into a label of a damaged region such as the crack and a label of dirt and the like.

A labeling image subjected to the labeling processing is the image in which labels "A", "B", and "C" are assigned to a set of "1", that is, a block of "1". In the image, it can be identified that the label "A" is a label of a crack portion and the labels "B" and "C" are block portions of the dirt and the like. A symbol is assigned as the label, but a number may be assigned. Further, a label is assigned to a crack portion appeared on an image, the number of pixels of the crack portion is measured from the labeling image, and a width and a length of the crack are measured from the number of pixels and resolution.

SUMMARY OF THE INVENTION

A crack often has a discontinuous shape, and it is difficult to determine intermittent lines as one crack.

At the point, there is a possibility that one crack is not appropriately connected since the connection determination is performed using the Euclidean distance in JP2011-242365A. That is, even if cracks are apart from each other by the Euclidean distance, some cracks are recognized as one crack from a human eye, and there is a possibility that the connection of the cracks with only the Euclidean distance as the reference is not compatible with crack connection in an actual operation.

Therefore, it can be considered that a user performs an operation to designate only a specific crack with respect to an automatic crack detection result as in JP2011-242365A to edit the automatic crack detection result. For example, there is a case where it is determined as an erroneous detection and one entire crack is deleted or the like.

However, since a shape of the crack generated in concrete becomes complicated as the crack progresses, in a case where only a desired crack from dense cracks on the image is designated, pointing to an appropriate position is time-consuming work and an error is likely to occur.

In a case where a position and a region of each crack is not known in advance, it takes time to select the position and the region of each crack and an error is likely to occur due to the complexity of the shape of each crack. In particular, since the crack has an intermittent shape and the detection result is discontinuous according to the shape of the crack, it is not easy to select the region. In a case where the cracks are densely distributed, difficulty of selecting the region is further increased.

However, in the technique of JP2002-174601A, it is possible to distinguish a crack from dirt with labels, but it is impossible to designate defect information such as a crack with the labels and to delete (edit and the like) the designated defect information.

The present invention is made in view of the above problems, and a purpose of the present invention is to easily designate and edit one crack by appropriately labeling discontinuous cracks.

In order to solve the problems described above, a crack information editing device according to a first aspect of the present invention includes a crack information acquisition unit that acquires crack information on a crack of a structure detected by an image analysis of a surface image of the structure, a labeling unit that assigns a label for identifying crack information based on the crack information acquired by the crack information acquisition unit, a display unit that displays a video image indicating the crack information on the surface image in an overlapped manner and displays a video image indicating the label assigned by the labeling unit in association with the video image indicating the crack information, a label selection unit capable of accepting selection of a predetermined label from among labels displayed by the display unit, and a crack information editing unit that accepts editing of crack information associated with the label for which the selection by the label selection unit is accepted.

The crack information editing device according to the aspect can accept the editing of the crack information associated with the selected label by label selection. Therefore, it is possible to easily select and edit the crack information by a user operation.

In the crack information editing device according to a second aspect of the present invention, the editing of the crack information accepted by the crack information editing unit includes deleting the crack information, combining a plurality of pieces of discontinuous crack information associated with a plurality of randomly selected labels into one continuous piece of crack information, or releasing the combination between the plurality of pieces of discontinuous crack information.

It is possible to accept deletion, combination, and release of the combination of the crack information associated with the selected label by the label selection. Therefore, it is possible to easily edit the crack information by a user operation.

In the crack information editing device according to a third aspect of the present invention, the labeling unit updates the label of the crack information acquired by the crack information acquisition unit according to the editing of the crack information, and the display unit updates the video image indicating the crack information and the video image indicating the label according to the editing of the crack information.

Accordingly, it is possible to visually and easily confirm an editing result of the crack information relating to the selected label.

In the crack information editing device according to a fourth aspect of the present invention, in a case where deletion of the crack information is accepted by the crack information editing unit, the labeling unit deletes the selected label, and the display unit stops a display of a video image indicating crack information corresponding to the selected label.

Accordingly, it is possible to visually and easily confirm a deletion result of the crack information relating to the selected label.

In the crack information editing device according to a fifth aspect of the present invention, in a case where a combination between the plurality of pieces of crack information is accepted by the crack information editing unit, the labeling unit assigns a common label to the plurality of pieces of crack information for which the combination is accepted, and the display unit displays a video image indicating the common label in association with a video image indicating the combined plurality of pieces of crack information.

Accordingly, it is possible to visually and easily confirm a combination result of the crack information relating to the selected label.

In the crack information editing device according to a sixth aspect of the present invention, in a case where release of the combination between the plurality of pieces of crack information is accepted by the crack information editing unit, the labeling unit assigns a label capable of distinguishing between the plurality of pieces of crack information for which the release of the combination is accepted to each of the plurality of pieces of crack information, and the display unit displays each of the distinguishable labels in association with a video image indicating each of the plurality of pieces of crack information.

Accordingly, it is possible to visually and easily confirm a release result of the combination of the crack information relating to the selected label.

In the crack information editing device according to a seventh aspect of the present invention, the display unit displays a video image indicating the label assigned by the labeling unit at a position outside the video image indicating the crack information.

Accordingly, visibility is improved without interference of the video image of the crack information with the video image of the label.

In the crack information editing device according to an eighth aspect of the present invention, the video image indicating the label is a balloon individually including a label for each of the crack information acquired by the crack information acquisition unit or a list table including a plurality of labels of the crack information acquired by the crack information acquisition unit.

Since a predetermined label can be selected from the balloon including the crack information or the list table including the plurality of labels of the crack information, it is easy to select the label.

In the crack information editing device according to a ninth aspect of the present invention, the display unit highlights the video image of the crack information associated with the selected label.

Accordingly, it is easy to identify the crack information relating to the selected label.

In the crack information editing device according to a tenth aspect of the present invention, the crack information acquisition unit acquires the crack information on the crack of the structure by Kruskal's algorithm, Prim's algorithm, neural network convergence calculation, percolation method, or the like.

In the crack information editing device according to an eleventh aspect of the present invention, the crack information is vector data including a width, a length, and a direction of a crack.

A method of editing crack information according to a twelfth aspect of the present invention, a computer executes a step of acquiring crack information on a crack of a structure detected by an image analysis of a surface image of the structure, a step of assigning a label for identifying crack information based on the acquired crack information, a step of displaying a video image indicating the crack information on the surface image in an overlapped manner and displaying a video image indicating the assigned label in association with the video image indicating the crack information, a step of accepting selection of a predetermined label from among the displayed labels, and a step of accepting editing of crack information associated with the label for which the selection is accepted.

A crack information editing program for causing a computer to execute the method of editing crack information described above is also included in an aspect of the present invention.

According to the present invention, it is possible to accept the editing of the crack information associated with the selected label by the label selection. Therefore, it is possible to easily select and edit the crack information by a user operation.

BRIEF DESCRIPTION OF THE DRAWINGS

FIG. 9 is a table indicating image information included in hierarchical structure information.

FIG. 10 is a diagram illustrating an example of damage vector information (corresponding to example 1 of method of determining hierarchy) included in the hierarchical structure information.

FIG. 13 is a table indicating an example of hierarchical structure information (damage vector information) corresponding to example 2 of the method of determining hierarchy.

FIG. 17 is a table indicating an example of hierarchical structure information (damage vector information) corresponding to example 3 of the method of determining hierarchy.

FIG. 19 is a table indicating an example of hierarchical structure information (damage vector information) corresponding to example 4 of the method of determining hierarchy.

FIG. 22 is a diagram illustrating an example of the hierarchical structure information in which "1" is assigned to a delete operation flag of the damage vector corresponding to the label of C1-3 as the result of performing the delete instruction input.

FIG. 25 is a diagram illustrating an updated example of the hierarchical structure information in which "2" is assigned to an add operation flag of the damage vectors corresponding to the labels of C1-5 and C8-1.

FIG. 28 is a diagram illustrating an example of the hierarchical structure information in which "0" is assigned to the add operation flag of the damage vectors corresponding to the labels of C1-5 and C8-1.

DESCRIPTION OF THE PREFERRED EMBODIMENTS

Hereinafter, embodiments of a crack information editing device, a method of editing crack information, and a crack information editing program according to the present invention will be described with reference to accompanying drawings.

First Embodiment

Figure 1:
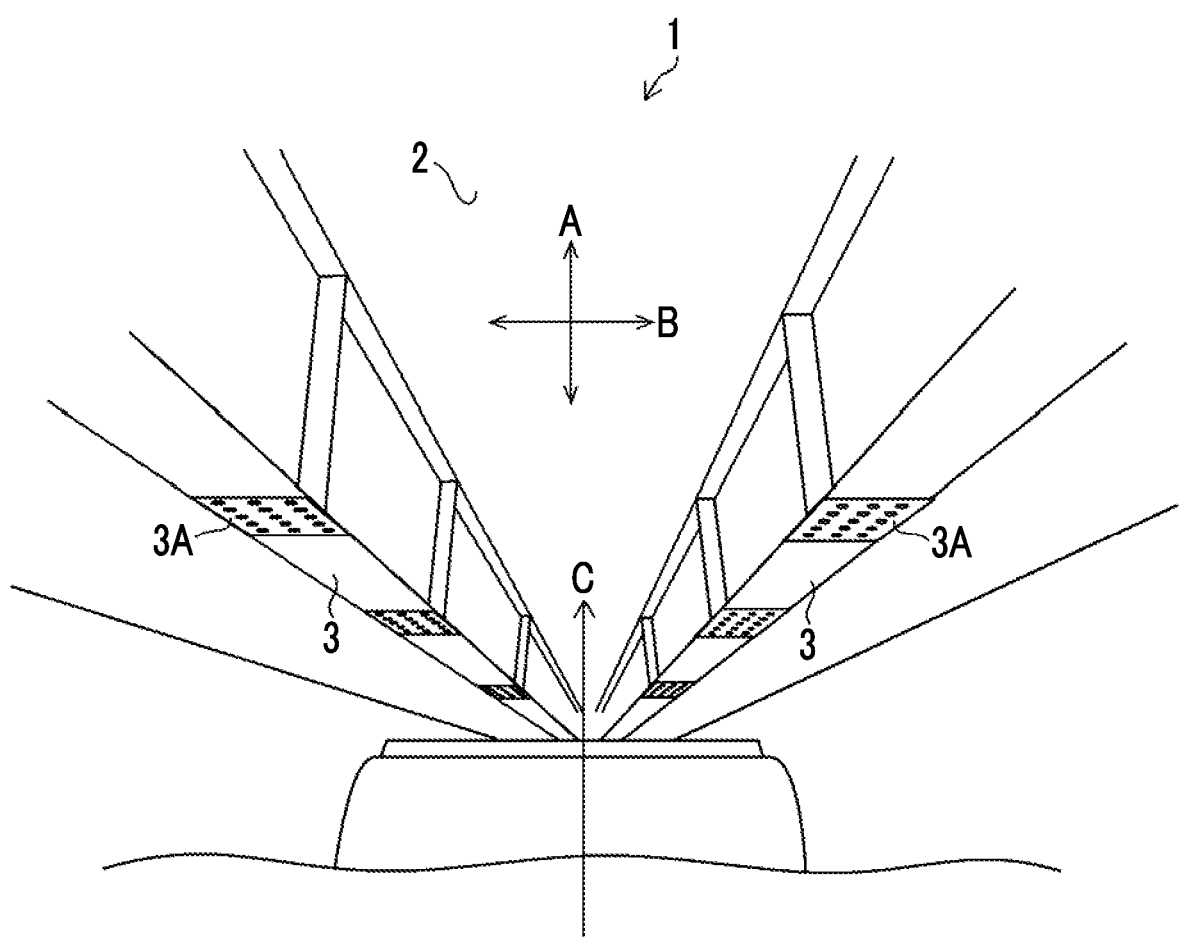
FIG. 1 is a diagram illustrating a bridge which is an example of a structure.

FIG. 1 is a perspective view illustrating a structure of a bridge 1 (structure and concrete structure) which is an example of the structure in which the crack information editing device, the method of editing crack information, and the crack information editing program according to the present invention are employed. The bridge 1 illustrated in FIG. 1 has a main girder 3, and the main girders 3 are joined by joining parts 3A. The main girder 3 is bridged between an abutment and/or a bridge pier and is a member for supporting a load of a vehicle and the like on a floor slab 2. The floor slab 2 for the vehicle and the like to run is installed on the upper part of the main girder 3. It is assumed that the floor slab 2 is made of reinforced concrete. The bridge 1 has members such as a cross girder, a cross frame, and a lateral frame (not illustrated) in addition to the floor slab 2 and the main girder 3.

<Image Acquisition>

In a case where damage of the bridge 1 is inspected, an inspector images the bridge 1 from the lower side (C direction of FIG. 1) using a digital camera 104 (refer to FIG. 2) and acquires a surface image of an inspection range. The imaging is performed while appropriately moving in an extending direction (A direction of FIG. 1) of the bridge 1 and an orthogonal direction (B direction of FIG. 1) of the extending direction. In a case where it is difficult for the inspector to move due to a surrounding condition of the bridge 1, the imaging may be performed by installing the digital camera 104 in a moving object that can move along the bridge 1. A lifting mechanism and/or a pan and tilt mechanism of the digital camera 104 may be provided in such moving object. An example of the moving object includes a vehicle, a robot, or a flying object, but is not limited thereto.

<Configuration of Damage Information Processing Device>

Figure 2:
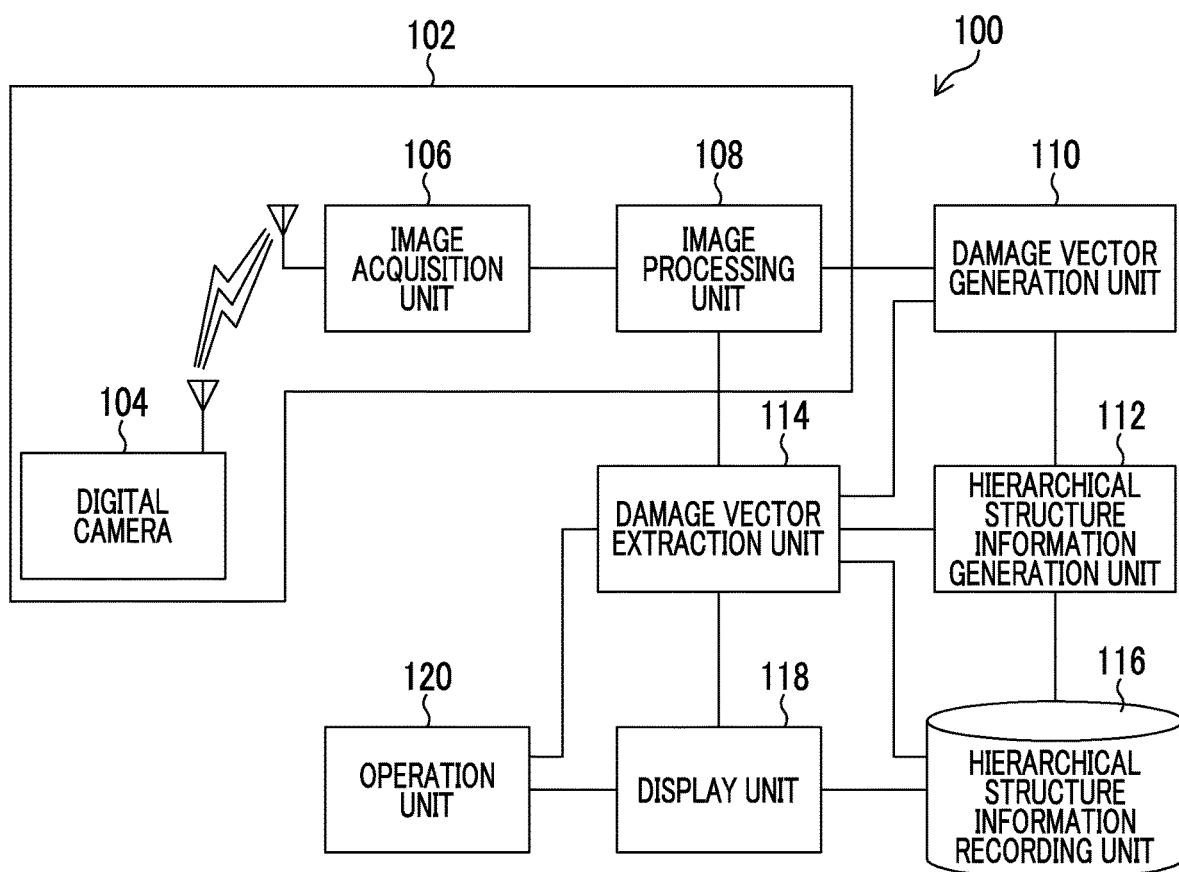
FIG. 2 is a block diagram illustrating a configuration of a damage information processing device according to one embodiment of the present invention.

FIG. 2 is a block diagram illustrating a schematic configuration of a damage information processing device 100 which is the embodiment according to the crack information editing device of the present invention. The damage information processing device 100 includes a damage information acquisition unit 102 (corresponding to crack information acquisition unit), a damage vector generation unit 110 (corresponding to labeling unit), a hierarchical structure information generation unit 112, a damage vector extraction unit 114, a hierarchical structure information recording unit 116 (corresponding to crack information editing unit), a display unit 118 (corresponding to display unit), and an operation unit 120 (corresponding to label selection unit). The above units are connected to each other and can transmit and receive necessary information to each other.

A function of each unit can be realized, for example, by causing a control device such as a central processing unit (CPU) to execute a program stored in a memory. The damage information acquisition unit 102 includes a wireless communication antenna and an input or output interface circuit, and the hierarchical structure information recording unit 116 is composed to include a non-transitory recording medium such as a hard disk drive (HDD). The display unit 118 includes a display device such as a liquid crystal display, and the operation unit 120 includes an input device such as a keyboard. The above configuration indicates an example of the configuration of the damage information processing device according to the present invention, and another configuration may be employed as appropriate.

The image captured using the digital camera 104 as described above is input to an image acquisition unit 106 by wireless communication, and damage information is acquired by an image processing unit 108. The digital camera 104, the image acquisition unit 106, and the image processing unit 108 compose the damage information acquisition unit 102. The damage vector generation unit 110 generates a damage vector (crack vector) by performing an image analysis from the damage information acquired by the damage information acquisition unit 102 and connects spatially separated damage vectors. The hierarchical structure information generation unit 112 generates hierarchical structure information based on the damage vector generated by the damage vector generation unit 110, and the generated hierarchical structure information is recorded in the hierarchical structure information recording unit 116. The damage vector extraction unit 114 extracts a damage vector that satisfies a designated condition such as a hierarchy to which the damage vector belongs with reference to the hierarchical structure information. The display unit 118 displays all or a part of the input image, the generated or extracted damage vector, the hierarchical structure information, and the like in an overlapped manner or alone. The display unit 118 performs image processing necessary for display such as generating an image of a line segment from information of the damage vector. The operation unit 120 accepts instruction inputs by a user relating to extraction conditions of the damage vector and the hierarchical structure information, a setting of a display condition, editing of the hierarchical structure information, and the like.

<Procedure of Damage Information Processing>

Figure 3:
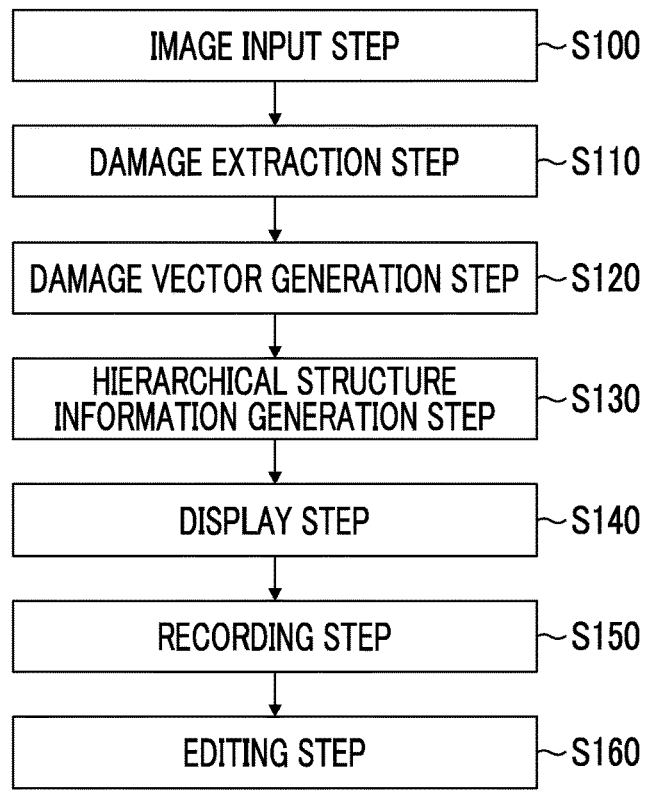
FIG. 3 is a flowchart illustrating a procedure of a method of processing damage information according to one embodiment of the present invention.

Next, damage information processing (corresponding to the method of editing crack information of the present invention) using a damage information processing device 100 having the configuration described above will be described. FIG. 3 is a flowchart illustrating a procedure of the damage information processing according to the embodiment. In the embodiment, a case where the damage is the crack generated in the floor slab 2 is described, and the damage is described as "crack" as appropriate. However, the damage in which the present invention can be employed is not limited to the crack but may be another piece of damage such as free lime. A program (corresponding to the crack information editing program of the present invention) for causing the damage information processing device 100 to execute the processing is recorded in a computer-readable non-transitory tangible medium such as a flash memory built in the damage information processing device 100.

<Damage Information Acquisition Step>

First, the image of the bridge 1 captured by the digital camera 104 as described above is input to the image acquisition unit 106 by the wireless communication (step S100; image input step). A plurality of images of the bridge 1 are input according to the inspection range, and information of imaging date and time is added to the input images by the digital camera 104. The imaging date and time of the input images are not necessarily the same in all the images and may be over several days. The plurality of images may be collectively input or one image may be input at a time. The image of the bridge 1 may be input through the non-transitory recording mediums such as various memory cards instead of the wireless communication or data of an image already captured and recorded may be input via a network. The image of the bridge 1 input in step S100 may be the captured image as it is or may be an image obtained by subjecting the captured image to pre-processing.

<Damage Extraction Step>

Next, the image processing unit 108 extracts the damage (crack) from the input image (step S110; the damage extraction step). The image input step of step S100 and the damage extraction step of a step S110 compose the damage information acquisition step in the method of processing damage information of the present invention. In step S110, in a case where damage is extracted from the image input in step S100, that is, a damaged region in the image is identified, it may be considered that the damage information is acquired and there is no need to grasp a detailed feature of the damage.

The damage extraction in step S110 can be performed by various methods, and a method of detecting the crack disclosed, for example, in JP4006007B can be used. The method is the method of detecting the crack consisted of a step of creating a wavelet image by calculating wavelet coefficient corresponding to two concentrations to be compared and calculating each wavelet coefficient in a case where the two concentrations are respectively changed to create a wavelet coefficient table, and performing wavelet conversion of the input image obtained by imaging a concrete surface which is a crack detection target, and a step of determining a crack region and a non-crack region by comparing a wavelet coefficient of an interest pixel with a threshold value with wavelet coefficient, corresponding to an average concentration of near pixels and a concentration of the interest pixel within a local region, as the threshold value in the wavelet coefficient table.

The damage extraction in step S110 may be performed after subjecting the image input in step S100 to the necessary pre-processing.

<Generation of Damage Vector>

Figure 4:
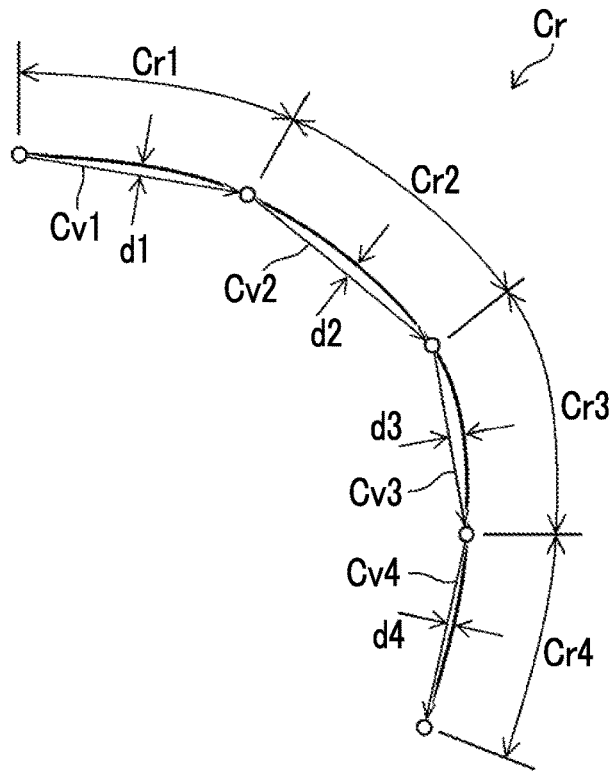
FIG. 4 is a diagram illustrating a manner of dividing a curved damage to generate a plurality of damage vectors.

In a case where the damage is extracted in step S110 (damage information is acquired), the damage vector generation unit 110 vectorizes the acquired damage information to generate the damage vector (crack vector) (step S120; damage vector generation step). In the case of vectorization, the extracted damage (crack) is binarized and/or thinned as necessary. The "vectorization" refers to obtain a line segment determined by a start point and an end point for the damage. In a case where the damage (crack) is curved, the damage is divided into a plurality of sections such that a distance between a curved line and a line segment is equal to or less than a threshold value, and a damage vector is generated for each of the plurality of sections. In an example of FIG. 4, a curved damage Cr is divided into four sections Cr1 to Cr4 and damage vectors Cv1 to Cv4 are generated for respective sections such that distances d1 to d4 between pieces of damage in the sections Cr1 to Cr4 and the damage vectors Cv1 to Cv4 is equal to or less than the threshold value.

Figure 5:
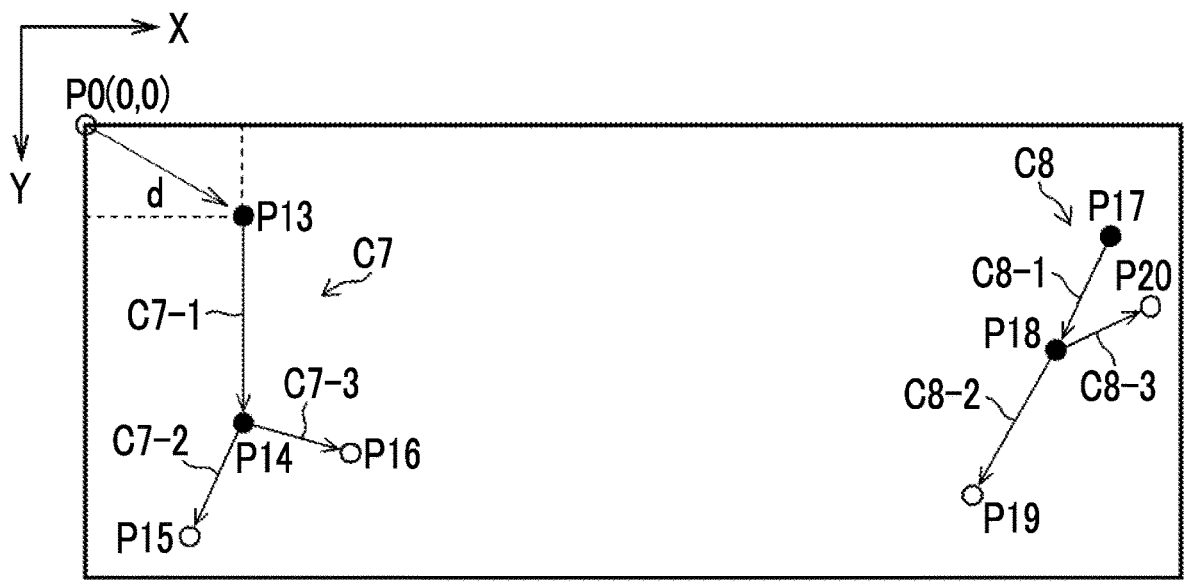
FIG. 5 is a diagram for describing a manner of determining start points of damage vectors.

In the case of generating the damage vector, for example, it is possible to set an termination point where a distance from the origin is minimum as a first start point and to sequentially determine the end point and the start point along a running direction of the damage vector for a group of the damage vectors (vector group) using a feature point of the floor slab 2 as the origin of a coordinate system. In an example of FIG. 5, in a case where a point P0 on the floor slab 2 is set as the origin of the coordinate system and the right direction and the downward direction of the figure are respectively set as the X-axis direction and the Y-axis direction of the coordinate system, it is possible to set a point P13 where a distance d from the point P0 is the shortest among points P13, P14, P15, and P16 of a vector group C7 as the start point of a damage vector C7-1, the point P14 as the end point of the damage vector C7-1 (and start point of damage vectors C7-2 and C7-3), and the points P15 and P16 as the end points of respective damage vectors C7-2 and C7-3.

Figure 6:
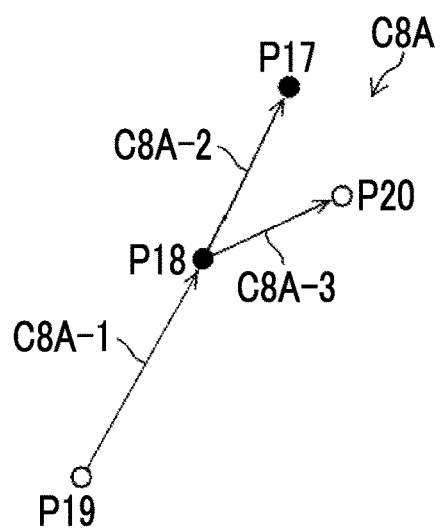
FIG. 6 is another diagram for describing a manner of determining a start point of the damage vector.

However, in a case where the start points of a vector group C8 are determined by the same method, since a point P17 becomes the start point of a damage vector C8-1 and a point P18 becomes the start point of damage vectors C8-2 and C8-3, a running direction of the damage vector C8-3 (direction from point P18 to point P20) is opposite to a running direction of the damage vector C8-1. In such case, as illustrated in FIG. 6, a point P19 may be set as the start point of a damage vector C8A-1, the point P18 may be the end point of the damage vector C8A-1 (and start points of damage vectors C8A-2 and C8A-3), and the points P17 and P20 may be respectively set as the end points of the damage vectors C8A-2 and C8A-3. In the case, a set of the damage vectors is expressed as a vector group C8A. Such processing may be performed by the damage vector generation unit 110 without the instruction input by the user or may be performed by the damage vector generation unit 110 based on the instruction input by the user through the operation unit 120.

<Connection of Separated Damage Vectors>

In the case of generating the damage vector as described above, there is a possibility that the damage is recognized as separated damage vectors in a case where the damage is continuous inside the floor slab 2 but is separated on the surface thereof. In the damage information processing device 100 according to the embodiment, such plurality of damage vectors are connected to generate one vector or a plurality of vectors.

Figure 7:
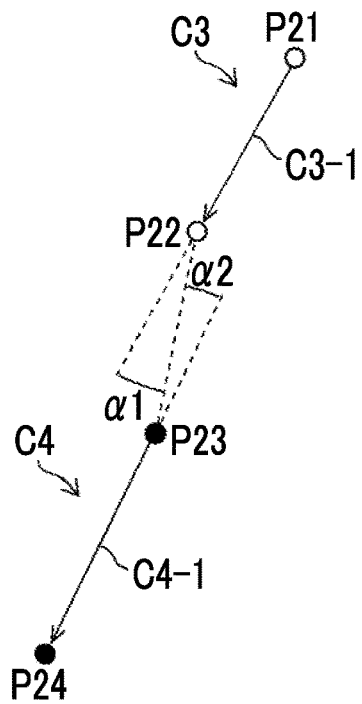
FIG. 7 is a diagram illustrating a connection of separated damage vectors.
Figure 8:
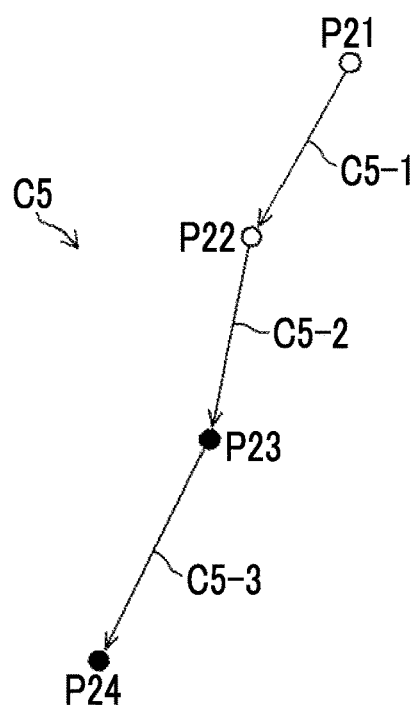
FIG. 8 is another diagram illustrating the connection of the separated damage vectors.

FIG. 7 is a diagram illustrating an example of the connection of damage vectors and illustrates a situation that a vector group C3 including a damage vector C3-1 (points P21 and P22 are respectively the start point and the end point) and a vector group C4 including a damage vector C4-1 (points P23 and P24 are respectively the start point and the end point) are extracted. An angle formed by the damage vector C3-1 with a line segment connecting the point P22 and the point P23 is set as α1, and an angle formed by the line segment connecting the point P22 and the point P23 with the damage vector C4-1 and is set as α2. At the time, in a case where both the angle α1 and the angle α2 are equal to or less than a threshold value, the damage vectors C3-1 and C4-1 are connected, and the vector groups C3 and C4 are merged. Specifically, a new damage vector C5-2 is generated to connect other damage vectors C5-1 (same as damage vector C3-1) and C5-3 (same as damage vector C4-1) as illustrated in FIG. 8, and a new vector group including the damage vectors C5-1, C5-2, and C5-3 is set as a vector group C5.

The above method is an example of a method of connecting the damage vectors, and another method may be used. Whether to connect the damage vectors as described above may be determined by the damage vector generation unit 110 or by the damage vector generation unit 110 based on the instruction input by the user through the operation unit 120 regardless of the instruction input by the user.

In this manner, in the damage information processing device 100 according to the embodiment, it is possible to accurately grasp a connection relationship between the damage vectors by appropriately connecting the damage vectors separated (on the surface of floor slab 2) spatially.

<Generation of Hierarchical Structure Information>

In the case where the damage vector is generated in step S120, the hierarchical structure information generation unit 112 generates the hierarchical structure information based on the generated damage vector (step S130; hierarchical structure information generation step). The hierarchical structure information is information in which the connection relationship between the damage vectors is represented hierarchically and is composed of image information (refer to FIG. 9) and damage vector information (refer to FIGS. 10, 13, 17, and 19). The image information and the damage vector information are associated with each other through the vector group which is a set of the damage vectors (crack vectors). Therefore, it is possible to extract the damage vector with reference to identification (ID) of the vector group from the image of the damage and conversely to extract the image based on the damage vector. Since the hierarchical structure information is generated in the same item and format regardless of a hierarchy (level) to which the damage vector belongs (refer to FIGS. 10, 13, 17, and 19), the user can easily recognize and grasp the hierarchical structure information.

<Image Information>

The image information described above is information on the captured image in which the damage is imaged and defines identification information (ID) and image data of the captured image, image acquisition date and time, and the like for the group of the damage vectors. FIG. 9 is a table indicating an example of the image information, and an ID of an image, image data, acquisition date and time, width and height of the image, the number of channels, bit/pixel, and resolution are defined for a vector group C1 (refer to FIG. 11A). The number of channels is three channels for an RGB (R: red, G: green, B: blue) color image and is one channel for a monochrome image. Only the vector group C1 is described in FIG. 9. However, in a case where a plurality of vector groups exist, the same information is generated for each group.

<Damage Vector Information>

FIG. 10 is an example of the damage vector information. The damage vector information is composed of information of the vector group to which the damage vector belongs, specific information of each damage vector, information of another damage vector connected to each damage vector in the vector group, and additional information.

Figure 11A:
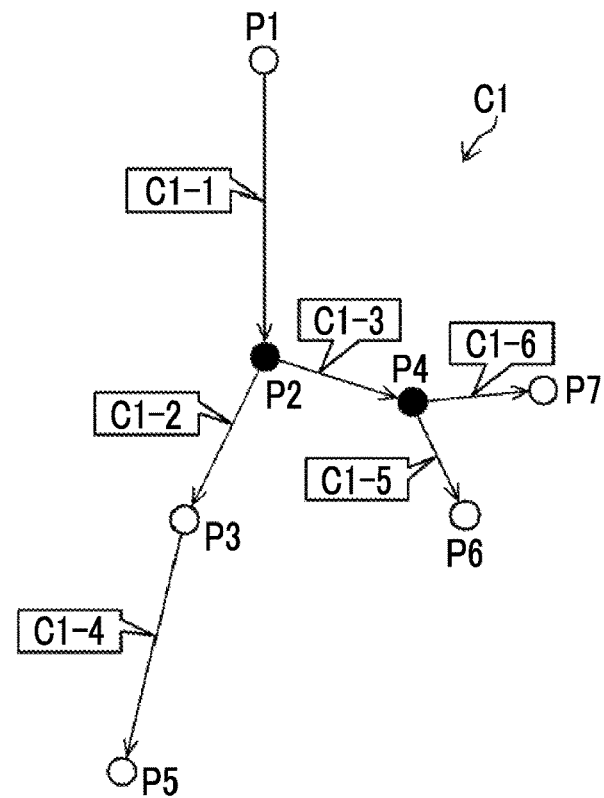
FIG. 11A is a diagram for describing a display example of the damage vectors and labels.

The information of the vector group (refer to vector group C1 in a case of the table of FIG. 10; FIG. 11A) includes a label (identification information) of the group. The specific information of the damage vector includes label (identification information) of the damage vector, hierarchy (level; belonging hierarchy information), start point and end point (point number and position coordinate), and length. Here, in the hierarchy (level), level 1 is the highest hierarchy, and the hierarchy becomes lower as the number increases. Specifically, a method of determining hierarchy will be described below in detail. Other pieces of information of the damage vector include labels (identification information) of a parent vector, a sibling vector, and a child vector as described below. The additional information includes the width of damage, delete operation flag, add operation flag, inspection date, and repair information.

<Parent Vector, Sibling Vector, and Child Vector>

In the embodiment, in a case where the end point of one damage vector is the start point of another damage vector, the formal damage vector is referred to as "parent vector" and the latter damage vector is referred to as "child vector". The parent vector is determined so as to be zero or one for one damage vector, but the child vector may exist by a predetermined number of zero or more for one parent vector. In a case where the end point of the parent vector is the start point of a plurality of child vectors, the plurality of child vectors are referred to as "sibling vectors" from each other. The sibling vector may also exist by a predetermined number of zero or more.

In this manner, in the embodiment, since the hierarchical structure information includes the labels (identification information) of the parent vector, the sibling vector, and the child vector, it is possible to sequentially specify a parent vector, a sibling vector, and a child vector with reference to vector ID based on a predetermined damage vector. For example, it is possible to specify a parent vector of a certain damage vector and to further specify a parent vector of the parent vector. In this manner, in the damage information processing device 100 according to the embodiment, it is possible to easily grasp the connection relationship between the damage vectors and to easily analyze and search the damage vector.

<Additional Information>

The "width" included in the additional information indicates a width of the crack corresponding to each damage vector. The delete operation flag indicates whether a delete operation is performed on the vector. The delete operation flag is "1" in a case where the delete operation is performed and "0" in a case where the delete operation is not performed. It is possible to switch between display and non-display of the damage vector with reference to the delete operation flag. The add operation flag is related to a detection form of the damage vector. The add operation flag is "0" in a case of a vector detected automatically, "1" in a case of a vector added manually (by the instruction input by the user), and "2" in a case of a vector generated by connecting vectors of different labels added manually.

A date on which the image of damage is captured is set on "inspection date", but the date can be edited by the instruction input by the user through the operation unit 120. The information of "repair" can be generated based on the instruction input (repair type and repair date) by the user through the operation unit 120. The repair type is, for example, filling with cement, filling with resin, leaving (follow-up observation), or the like (respectively described as R1, R2, and R3 in the table of FIG. 10).

<Hierarchy of Damage Vector>

Next, the hierarchy (level) to which the damage vector belongs will be described. The hierarchy of the damage vector can be determined by various methods, for example, as described in the following examples 1 to 4.

Method of Determining Hierarchy (Example 1)

FIG. 11A is a diagram illustrating the vector group C1. The vector group C1 is composed of damage vectors C1-1 to C1-6, and the damage vectors have points P1 to P7 as the start points or the end points. In such situation, in example 1, it is assumed that the hierarchy becomes lower every time the damage vector diverges (end point of a certain damage vector becomes start point of a plurality of other damage vectors). Specifically, it is assumed that the hierarchy of the damage vector C1-1 is "level 1" which is the highest level, and the hierarchy of the damage vectors C1-2 and C1-3 having the point P2 which is the end point of the damage vector C1-1 as the start point is "level 2", which is a level lower than the damage vector C1-1. Similarly, it is assumed that the hierarchy of the damage vectors C1-5 and C1-6 having the point P4 which is the end point of the damage vector C1-3 as the start point is "level 3", which is a level lower than the damage vector C1-3. On the other hand, the point P3 which is the end point of the damage vector C1-2 is the start point of the damage vector C1-4. However, since the damage vector having the point P3 as the start point is only the damage vector C1-4 and does not diverge, it is assumed that the hierarchy of the damage vector C1-4 is "level 2" which is the same as the C1-2. The hierarchy of each damage vector determined in this manner is included in the hierarchical structure information as indicated in the table of FIG. 10.

As illustrated in FIG. 11A, an individual label of each damage vector is displayed on the display unit 118 in association with each damage vector by a balloon video image starting from the start point, the end point, or a predetermined position near the line segment connecting the start point and the end point of each corresponding damage vector. The label of each damage vector may be displayed in association with each damage vector by a video image such as a flag, a plate, a box, a line, a table, or the like or a combination of all or a part of the video images starting from a predetermined position near the line segment of each corresponding damage vector. The balloon may be disposed outside the video image of the damage vector and positioned to avoid overlap with the damage vector itself.

Figure 11B:
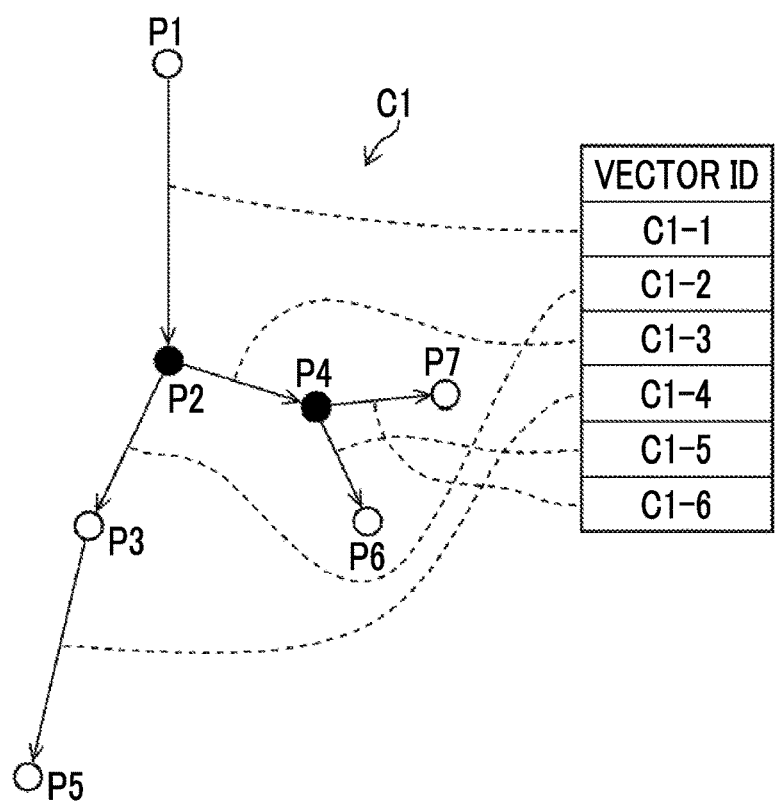
FIG. 11B is a diagram for describing a display example of the damage vectors and the labels.

A display position and a display format of the label are predetermined. In FIG. 11A, the labels are disposed near the damage vectors. However, as illustrated in FIG. 11B, a label group including a plurality of labels may be displayed in a list table on a blank portion of a screen which does not overlap the damage vector, and correspondence between each label and each damage vector may be indicated by associating each label with each damage vector with a line connecting each label and each damage vector on a one-to-one basis. The individual label indicated by the balloon or the like or the list table of the labels may not be displayed in an overlapped manner with the damage vector of the same group and may be displayed in an overlapped manner with the damage vector corresponding to a different group.

Method of Determining Hierarchy (Example 2)

Figure 12:
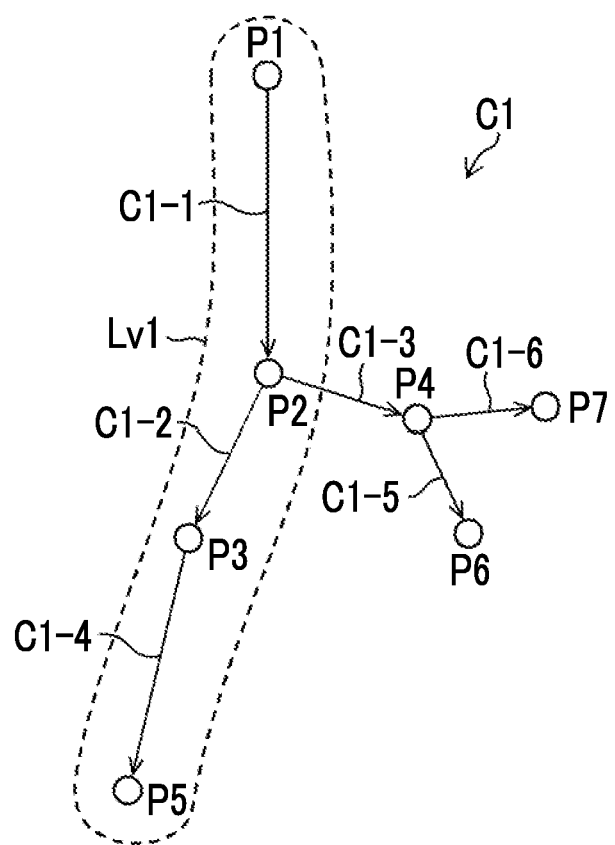
FIG. 12 is another diagram for describing example 2 of the method of determining hierarchy of the damage vectors.

FIG. 12 is a diagram illustrating the vector group C1 (connection relationship between damage vectors is the same as the connection relationship illustrated in FIG. 11A). In example 2, it is assumed that a damage vector (damage vector corresponding to a "trunk" in a tree structure) having an angle with another damage vector is equal to or less than a threshold value among the damage vectors to be connected belongs to the same hierarchy. Specifically, it is assumed that the damage vectors C1-1, C1-2, and C1-4 existing in a dotted line (range indicated by reference symbol Lv1) of FIG. 12 are "level 1" (the highest level) which is the same hierarchy. For the damage vectors C1-3, C1-5, and C1-6 other than the damage vectors C1-1, C1-2, and C1-4, similar to example 1, it is assumed that the hierarchy becomes lower every time the damage vector diverges, the damage vector C1-3 (corresponding to a "branch" in the tree structure) is "level 2", and the damage vectors C1-5 and C1-6 (corresponding to a "leaf" in the tree structure) are "level 3". The hierarchy and the type (trunk, branch, or leaf) of each damage vector determined in this manner are included in the hierarchical structure information as illustrated in a table of FIG. 13.

Method of Determining Hierarchy (Modification Example of Example 2)

A modification example of the method of determining hierarchy (example 2) described above will be described. In a case of determining hierarchies of the damage vectors corresponding to the trunk, the branch, and the leaf in the tree structure as the method of determining hierarchy (example 2), since the "branch" is commonly considered to be shorter than the "trunk", the hierarchy may be determined with the longest damage vector as "trunk" (level 1) and with another damage vector as the "branch" or the "leaf". In the case, for example, in the damage vector information illustrated in the table of FIG. 13, the damage vector C1-1 having the length of 100 mm becomes the "trunk" (level 1). It is possible to set the damage vectors C1-2 and C1-3 as the "branches" (level 2), set the damage vector C1-4 as the "branch" (level 2) or the "leaf" (level 3), and set each of the damage vectors C1-5 and C1-6 as "leaf" (level 3).

A damage vector composing "the longest crack" instead of "the longest damage vector" may be set as the "trunk" (level 1), and a damage vector corresponding to a crack diverging from the "trunk" may be set as the "branch" or the "leaf". In the case, it is assumed that "the longest crack" means that "it is the longest as the crack in a state where a thick crack and a thin crack are all connected".

The type (trunk, branch, and leaf) and the hierarchy may be determined in consideration of the width (width of damage corresponding to damage vector) in addition to the length of the damage vector. For example, the hierarchy may be determined with a damage vector in which "length× width" is the maximum as the "trunk" and with another damage vector as the "branch" or the "leaf". In the case, for example, in the damage vector information illustrated in the table of FIG. 13, the damage vector C1-1 in which "length× width" is maximum (100 mm$^2$) becomes the "trunk". It is possible to set the damage vectors C1-2 and C1-3 as the "branches" (level 2), set the damage vector C1-4 as the "branch" (level 2) or the "leaf" (level 3), and set each of the damage vectors C1-5 and C1-6 as the "leaf" (level 3).

As the modification example described above, it is possible to improve the accuracy of hierarchization by determining hierarchy of the damage vector in consideration of the length or "length×width" of the damage vector.

Method of Determining Hierarchy (Example 3)

Figure 14:
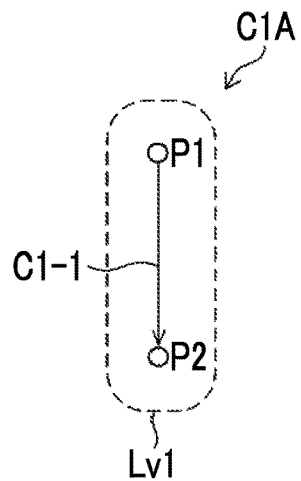
FIG. 14 is a diagram for describing example 3 of the method of determining hierarchy of the damage vector.
Figure 15:
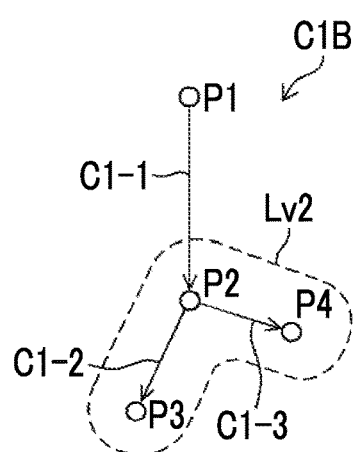
FIG. 15 is another diagram for describing example 3 of the method of determining hierarchy of the damage vectors and is a diagram illustrating an image captured later in time than in FIG. 14.
Figure 16:
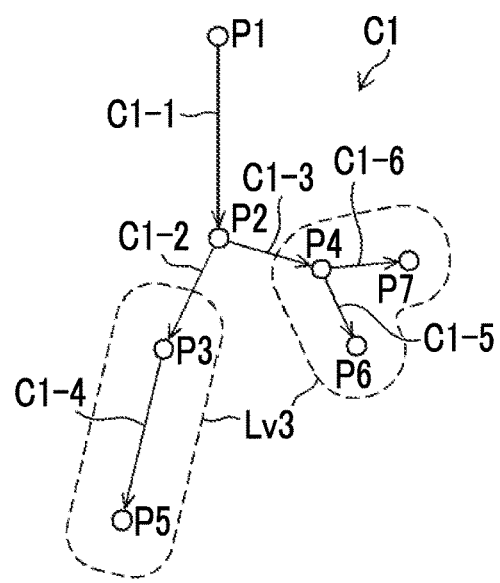
FIG. 16 is still another diagram for describing example 3 of the method of determining hierarchy of the damage vectors and is a diagram illustrating an image captured later in time than in FIG. 15.

FIGS. 14 to 16 are diagrams illustrating the vector group C1 (connection relationship between damage vectors is the same as the connection relationship illustrated in FIGS. 11A and 12). In example 3, an order of time when the damage vectors are generated is determined based on imaging date and time of the image of the bridge 1, and it is assumed that a damage vector generated later in time belongs to a lower hierarchy. In the cases of FIGS. 14 to 16, it is assumed that a vector group C1A including the damage vector C1-1 is generated in a first captured image (FIG. 14), the damage vectors C1-2 and C1-3 are newly generated to become a vector group C1B (FIG. 15) in a next captured image, and the damage vectors C1-4, C1-5, and C1-6 are further generated to become the vector group C1 in a finally captured image (FIG. 16).

In such situation, in example 3, it is assumed that the damage vector C1-1 (range indicated by reference symbol Lv1 in FIG. 14) generated in the first image is "level 1" of the highest level, the damage vectors C1-2 and C1-3 (range indicated by reference symbol Lv2 in FIG. 15) generated in the next image are "level 2", and the damage vectors C1-4, C1-5, and C1-6 (ranges indicated by reference symbols Lv3 in FIG. 16) generated in the final image are "level 3".

The hierarchy of each damage vector determined in this manner is included in the hierarchical structure information as described in a table of FIG. 17.

Method of Determining Hierarchy (Example 4)

Figure 18:
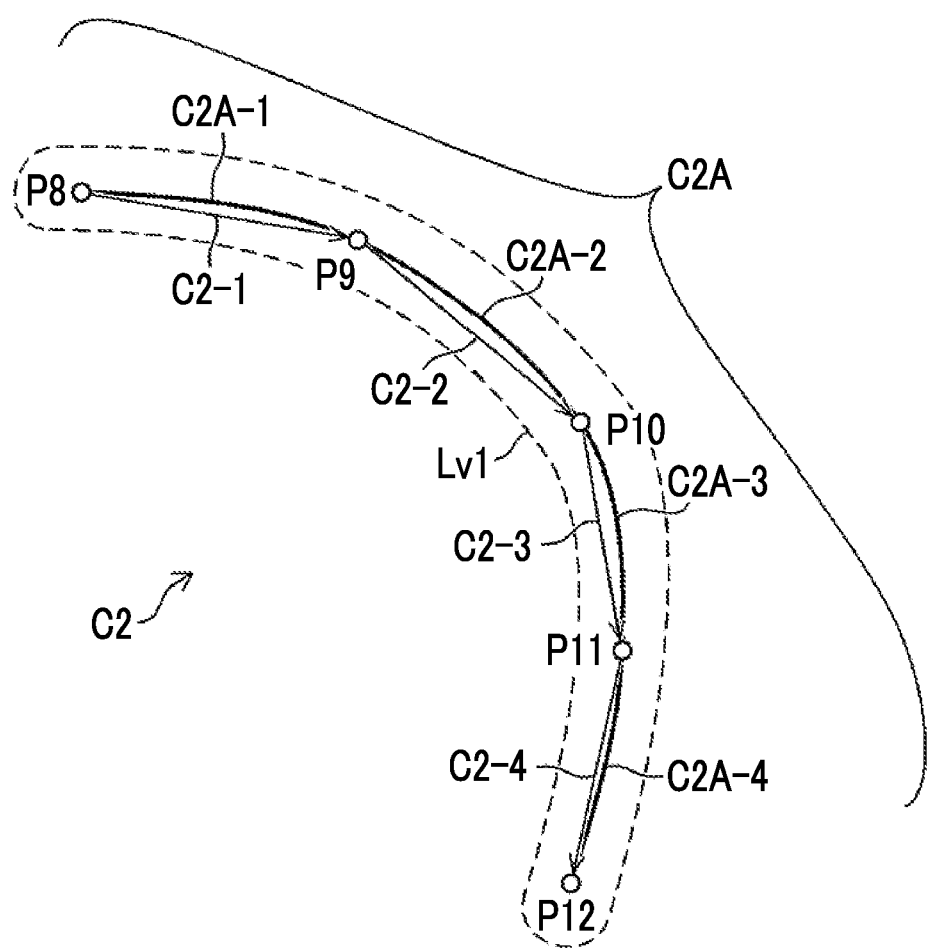
FIG. 18 is a diagram for describing example 4 of the method of determining hierarchy of damage vectors.

FIG. 18 is a diagram illustrating a crack C2A and a vector group C2 corresponding to the crack C2A. In example 4, in a case where another damage vector connected to one damage vector is only one, it is assumed that another damage vector belongs to the same hierarchy as one damage vector. Specifically, as illustrated in FIG. 18, in a case where one curved crack C2A is divided into a plurality of cracks C2A-1 to C2A-4, and the cracks respectively correspond to damage vectors C2-1 to C2-4 with points P8 to P12 as the start points or the end points, only one damage vector (damage vectors C2-2 to C2-4) is respectively connected to the end points of the damage vectors C2-1 to C2-3. In such case, in example 4, it is assumed that the damage vectors C2-1 to C2-4 (range indicated by reference symbol Lv1 in FIG. 18) are substantially considered as one and belong to "level 1" (the highest level) which is the same hierarchy.

The hierarchy of each damage vector determined in this manner is included in the hierarchical structure information as described in a table of FIG. 19.

The examples 1 to 4 of the methods of determining hierarchy to which the damage vector belongs are described. The methods can be used as appropriate according to a specific damage form and may be used by combining a plurality of the methods as necessary. For a group of damage vectors having a complicated connection pattern, for example, a hierarchy of a certain portion may be determined using example 1, and a hierarchy of another portion may be determined using example 4. Such combination of the hierarchy methods may be determined by the hierarchical structure information generation unit 112 or may be performed based on the instruction input by the user through the operation unit 120.

<Item and Format of Hierarchical Structure Information>

In the embodiment, as illustrated in the tables in FIGS. 10, 13, 17, and 19, since the hierarchical structure information has the same item and format regardless of the hierarchy to which the damage vector belongs, it is possible to quickly and easily grasp the connection relationship between the damage vectors.

<Extraction of Damage Vector>

Next, extraction of the damage vector will be described. In the embodiment, since the vector group to which the damage vector belongs, the label of the damage vector, the belonging hierarchy, the label of another damage vector (parent vector, the sibling vector, and the child vector) to be connected, and the like are included in the hierarchical structure information (refer to FIGS. 10, 13, 17, and 19), it is possible to designate a desired condition for the items and extract the damage vector. The designated condition includes, for example, "hierarchy to which the damage vector belongs" and "vector in which a specific vector is the parent vector, the sibling vector, or the child vector", but a condition that can be designated is not limited to above examples.

For example, in a case of the damage vector information illustrated in FIG. 10, the damage vectors C1-2, C1-3, and C1-4 are extracted with reference to a field of "hierarchy (level)" of the hierarchical structure information in a case of designating "hierarchy (level) of the damage vector is level 2" as the condition, and the damage vector C1-1 (parent vector) is extracted in a case of designating "damage vector which is connected to damage vector C1-2 and belongs to a hierarchy higher than the damage vector C1-2" as the condition. The damage vectors C1-3 (sibling vector) and C1-4 (child vector) are extracted in a case of designating "damage vector which is connected to damage vector C1-2 and belongs to the same hierarchy as the damage vector C1-2" as the condition, and the damage vectors C1-5 and C1-6 (child vector) are extracted in a case of designating "damage vector which is connected to damage vector C1-3 and belongs to a hierarchy lower than the damage vector C1-3" as the condition. In this manner, the extraction of the damage vector can be performed by the damage vector extraction unit 114 with reference to the hierarchical structure information recording unit 116 based on the instruction input by the user through the operation unit 120.

In this manner, in the damage information processing device 100 according to the embodiment, it is possible to easily search, analyze, and evaluate the damage vector. The extracted damage vector can be displayed in a format of individual information and/or line drawing (described below).

<Display of Damage Vector and Hierarchical Structure Information>

In a step S140, the hierarchical structure information generated in step S130 is displayed in the display unit 118 (display step). The display of the hierarchical structure information can be performed, for example, in the format of tables as indicated in FIGS. 9, 10, 13, 17, and 19 or by a part of information extracted from the tables. An example of such "a part of information" can include "information of damage vector extracted under designated condition" and "information on specific items such as inspection date and/or repair date".

The line drawing indicating the damage vector may be drawn based on the hierarchical structure information and displayed in the display unit 118. As indicated in the tables of FIGS. 10, 13, 17, and 19, since information on the start point and the end point of the damage vector and another damage vector to be connected is included in the hierarchical structure information, the line drawing (for example, refer to FIGS. 11A, 11B, 12, and 14 to 16) indicating the damage vector can be drawn and displayed based on the pieces of information. An arrow may be attached to the line drawing indicating the damage vector so as to identify a direction (direction from start point to end point) of the damage vector (refer to FIGS. 11A, 11B, 12, and 14 to 16).

In a case where the line drawing of the damage vector is drawn and displayed, all damage vectors included in the hierarchical structure information may be drawn and displayed or only a part of the damage vector (for example, extracted under the designated condition as described above) may be displayed.

In a case of displaying a line drawing indicating the damage vector, a video image of a corresponding label may be disposed near the line drawing or display conditions such as color, thickness, and line type (solid line, dotted line, or the like) of the damage vector may be changed according to specific information among information included in the hierarchical structure information. Such information can include, for example, hierarchy (level) of the damage vector, type (trunk, branch, or leaf), generation date and time, values of the delete operation flag and the add operation flag, and the like, and may be set as appropriate from among the items included in the hierarchical structure information. It is possible to easily grasp the connection relationship between the damage vectors and/or a manner of time change by displaying the line drawing in a form according to the feature of the damage vector in this manner.

Any one of the line drawing and the hierarchical structure information of the damage vector described above may be displayed or both the line drawing and the hierarchical structure information thereof may be displayed simultaneously. In the display described above, an image (for example, image "img_2015-001" indicated in table of FIG. 9) in which the damage (crack) is imaged may be displayed in an overlapped (superimposed) manner or side-by-side with a line drawing of the damage vector so as to compare both the image and the line drawing (for example, refer to FIG. 18).

In the embodiment, since the damage vector and/or the hierarchical structure information are displayed in this manner, it is possible to easily grasp the information of the damage vector and the connection relationship between the damage vectors.

<Recording of Damage Vector and Hierarchical Structure Information>

In a step S150, the hierarchical structure information is recorded in the hierarchical structure information recording unit 116 (recording step). The hierarchical structure information recorded in the hierarchical structure information recording unit 116 can be used for analysis, evaluation, and the like of the damage. In a case where a part of information (for example, damage vector satisfying designated condition) is extracted from the hierarchical structure information, since all the extracted information in this manner is included in the original hierarchical structure information, an extracted result may not be necessarily recorded. However, it is possible to quickly refer the extracted result as necessary by recording the extracted result in the hierarchical structure information recording unit 116.

<Editing of Damage Vector and Hierarchical Structure Information>

In a step S160, the hierarchical structure information generation unit 112 corrects the hierarchical structure information recorded in the hierarchical structure information recording unit 116 based on an editing instruction input by the user through the operation unit 120 (editing step). The display of the damage vector and the label is updated by the display unit 118 based on the editing instruction input.

The editing instruction input includes the followings.

(1) Deleting a damage vector corresponding to a randomly selected label. In a case where the editing instruction input is performed, "1" is assigned to the delete operation flag of a deleted damage vector.

A delete instruction input of the damage vector can be performed as follows. For example, in a case where a predetermined label is click-selected, the selected label and a line drawing of a damage vector corresponding to the selected label are highlighted. The highlighting is performed by a design change (coloring, dotted, thickening, brightness change, or the like) of the label and the line drawing of the damage vector. In a case where a dialog box for confirming whether to execute an editing operation "delete" that can be performed for the damage vector is displayed near the selected label, and permission to execute "delete" is selected from the dialog box, "1" is assigned to the delete operation flag of the damage vector corresponding to the selected label and the delete instruction input is completed.

Figure 20:
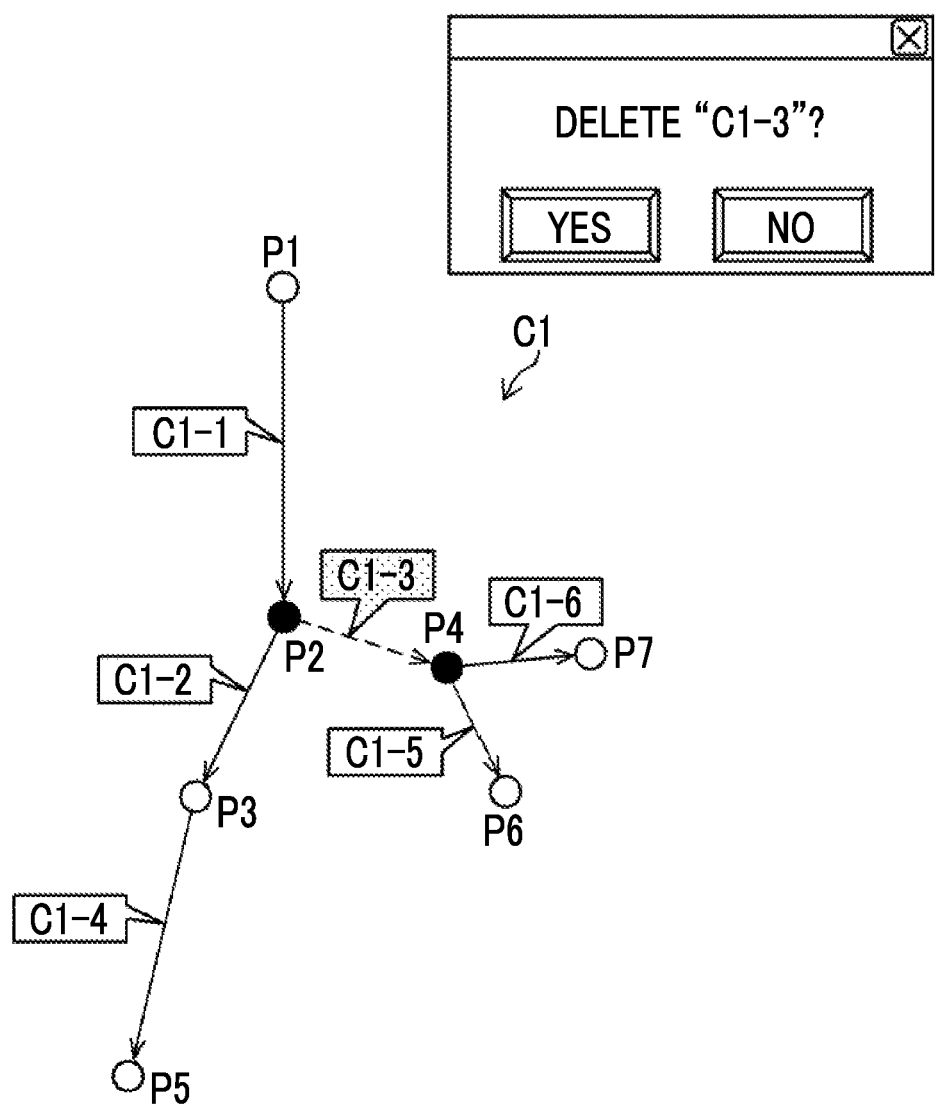
FIG. 20 is a diagram illustrating a manner in which a label of C1-3 is selected and a delete instruction input is performed to a damage vector corresponding to the label.
Figure 21:
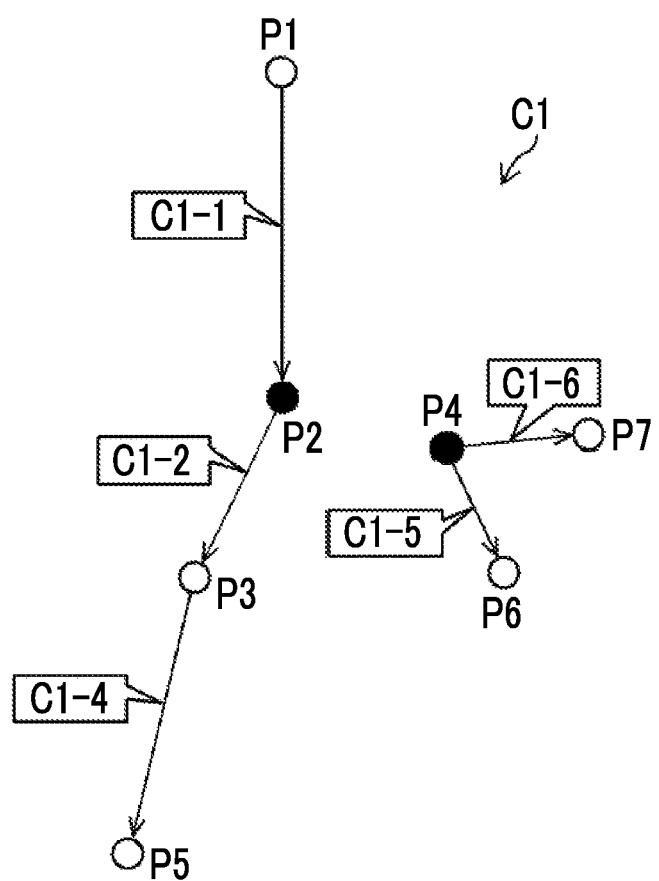
FIG. 21 is a diagram illustrating an updated display example in which a display of the label of C1-3 is deleted and a display of the damage vector corresponding to the label of C1-3 is deleted as a result of performing the delete instruction input to the damage vector corresponding to the label of C1-3.

FIG. 20 illustrates a manner in which the label of C1-3 is selected and the delete instruction input is performed to a damage vector corresponding to the label. FIG. 21 illustrates an updated display example in which the display of the label of C1-3 is deleted, and the display of the line drawing of the damage vector corresponding to the label of C1-3 is stopped as a result of performing the delete instruction input to the damage vector corresponding to the label of C1-3. FIG. 22 is an example of an editing result of the hierarchical structure information in which "1" is assigned to the delete operation flag of the damage vector corresponding to the label of C1-3 as the result of performing the delete instruction input. Even though the delete instruction input is performed to the damage vector, the hierarchical structure information corresponding to the damage vector is not deleted. This is for use in machine learning as described below.

(2) Adding or removing (partial addition or partial removal) a region composing a damage vector with respect to the damage vector corresponding to a randomly selected label. In a case where the editing instruction input is performed, "1" is assigned to the delete operation flag or the add operation flag corresponding to the selected label. Values of start point, end point, length, and width of the damage vector recorded in the hierarchical structure information are updated corresponding to an adding or removing region.

(3) Adding a damage vector that combines a plurality of discontinuous damage vectors associated with a plurality of randomly selected labels into one continuous damage vector. In a case where the editing instruction input is performed, "2" is respectively assigned to each add operation flag of each combined damage vector.

An add instruction input of the damage vector can be performed as follows. For example, in a case where two predetermined labels are click-selected, the selected labels and line drawings of damage vectors corresponding to the selected labels are highlighted, and a dialog box for confirming whether to execute an editing operation "combine" that can be performed for the corresponding damage vectors is displayed near the selected labels. In a case where permission to execute "combine" is selected from the dialog box, "2" is assigned to each add operation flag of each damage vector corresponding to the selected labels and the add instruction input of the damage vector is completed.

Figure 23:
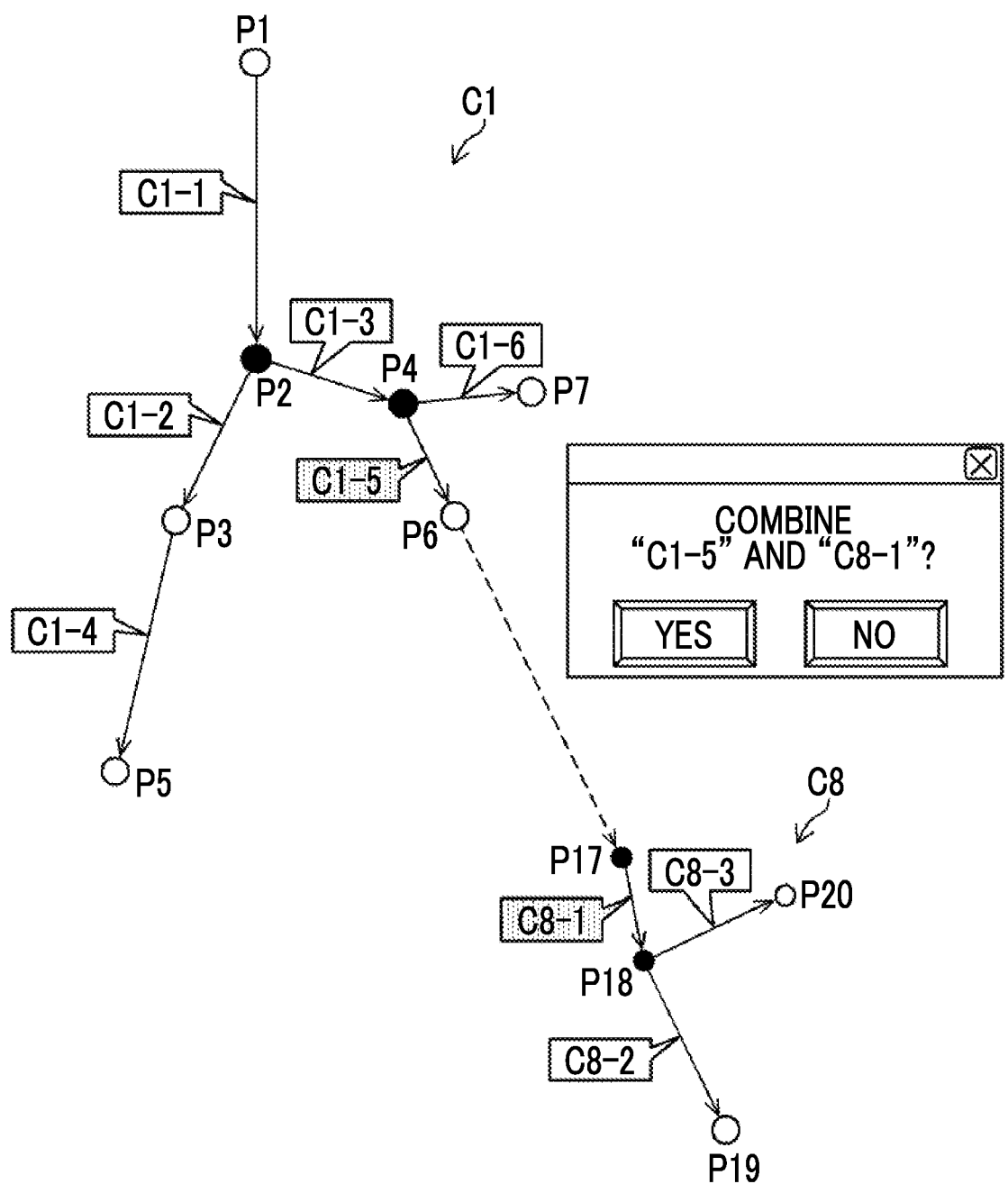
FIG. 23 is a diagram illustrating a manner in which labels of C1-5 and C8-1 are selected and a combination instruction input between damage vectors corresponding to the labels is performed.
Figure 24:
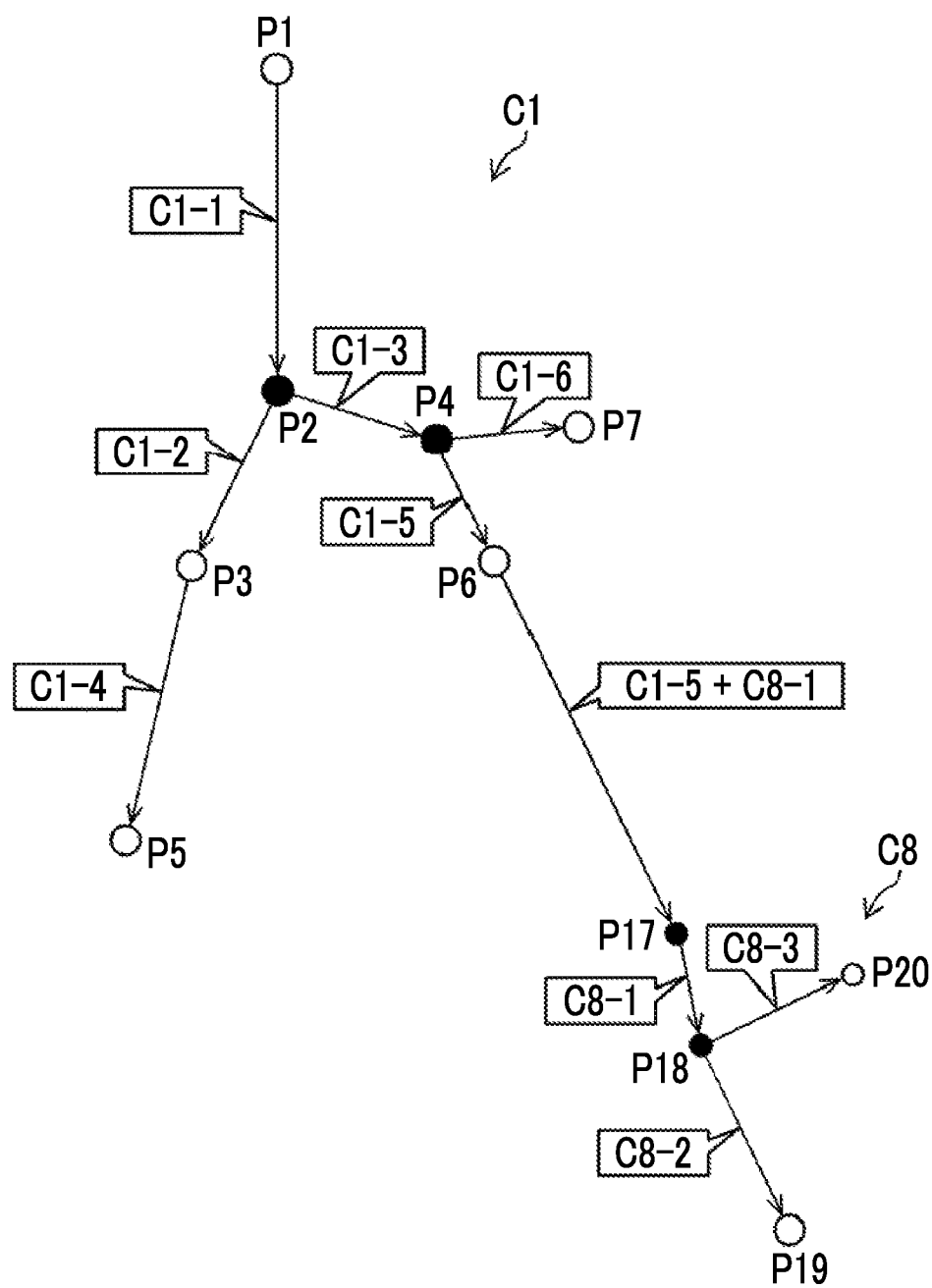
FIG. 24 is a diagram illustrating an updated display example of a line segment of a damage vector that combines the damage vectors corresponding to the labels of C1-5 and C8-1, and a label of "C1-5+C8-1" assigned to the added damage vector as a result of performing the combination instruction input.

FIG. 23 illustrates a manner in which labels of C1-5 and C8-1 are selected and the add instruction input of the damage vector that combines the damage vectors corresponding to the labels is performed. FIG. 24 illustrates an updated display example of a line drawing of an added damage vector that combines the damage vectors corresponding to the labels of C1-5 and C8-1 and a common label of "C1-5+C8-1" assigned to the damage vectors combined by the added damage vector as a result of performing the instruction input. In a case where the damage vectors corresponding to the labels of C1-5 and C8-1 are combined in a straight line, the display of points P6 and P17 may be also deleted (not illustrated). FIG. 25 is an updated example of the hierarchical structure information in which "2" is assigned to the add operation flag of the damage vectors corresponding to the labels of C1-5 and C8-1. The label of the combined damage vector may be anything that is distinguishable from another damage vector. The vector group of the combined damage vector may be the same as any vector group (for example, vector group to which long or short damage vector belongs) of the combined damage vectors or another new vector group may be generated. This can be performed in the same manner as described in <Connection of Separated Damage Vectors>.

In the updated hierarchical structure information, the damage vector of the previously selected label C1-5 is set as the parent vector, and the damage vector of the label C8-1 selected later is set as the child vector. In a case where the label C8-1 is previously selected, and the label C1-5 is selected later, the damage vector of the label C8-1 is set as the parent vector, and the damage vector of the label C1-5 is set as the child vector. In any case, the plurality of damage vectors C1-5 and C8-1 in which "2" is assigned to the add operation flag and the added damage vector that combines with any one of the damage vectors C1-5 and C8-1 as the parent vector and with the other as the child vector are collectively one continuous combined damage vector, and a new label "C1-5+C8-1" is assigned to the one continuous combined damage vector in a case where the damage vectors C1-5 and C8-1 and the added damage vector are combined in a straight line.

(4) Releasing the combination between the plurality of discontinuous damage vectors associated with the plurality of labels. In a case where the release instruction input of the combination is performed, "0" is respectively assigned to each add operation flag of each damage vector in which the combination is released.

The release instruction input of the combination between the damage vectors can be performed as follows. For example, in a case where a predetermined label is selected from among the labels of the combined damage vectors by above-described (3), the selected label and a line drawing of a corresponding combined damage vector are highlighted, and a dialog box for confirming whether to execute an editing operation "release combination" that can be performed for the corresponding combined damage vectors is displayed near the selected label. In a case where permission to execute "release combination" is selected from the dialog box, each add operation flag of each damage vector combined by the combined damage vector corresponding to the selected label is changed from "2" to "0", the relationship of the parent vector and the child vector of each damage vector is deleted, and the combination release instruction input of the damage vector is completed.

Figure 26:
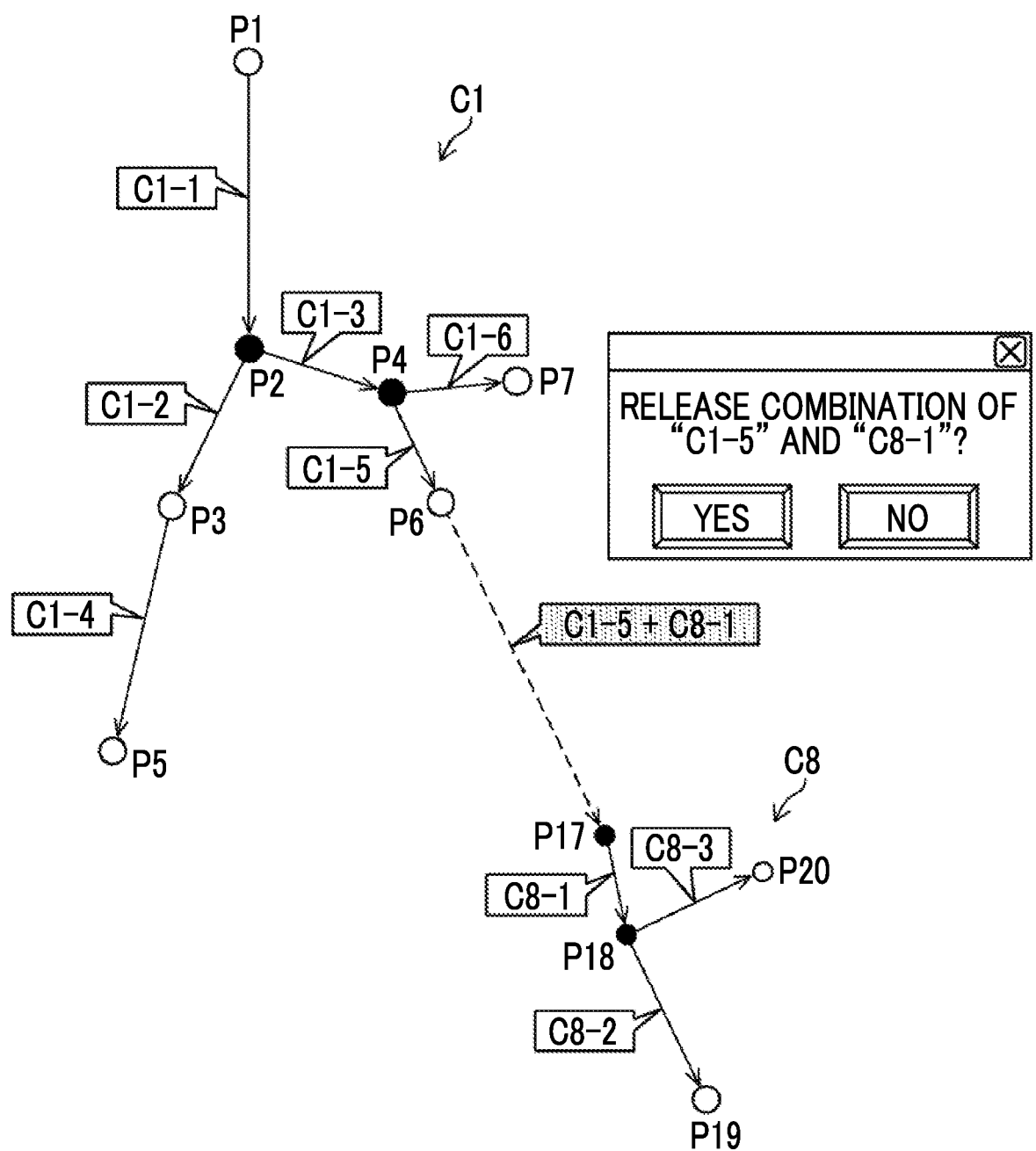
FIG. 26 is a diagram illustrating a manner in which the label of "C1-5+C8-1" corresponding to the added damage vector is selected and a combination release instruction input between the damage vectors corresponding to the labels is performed.
Figure 27:
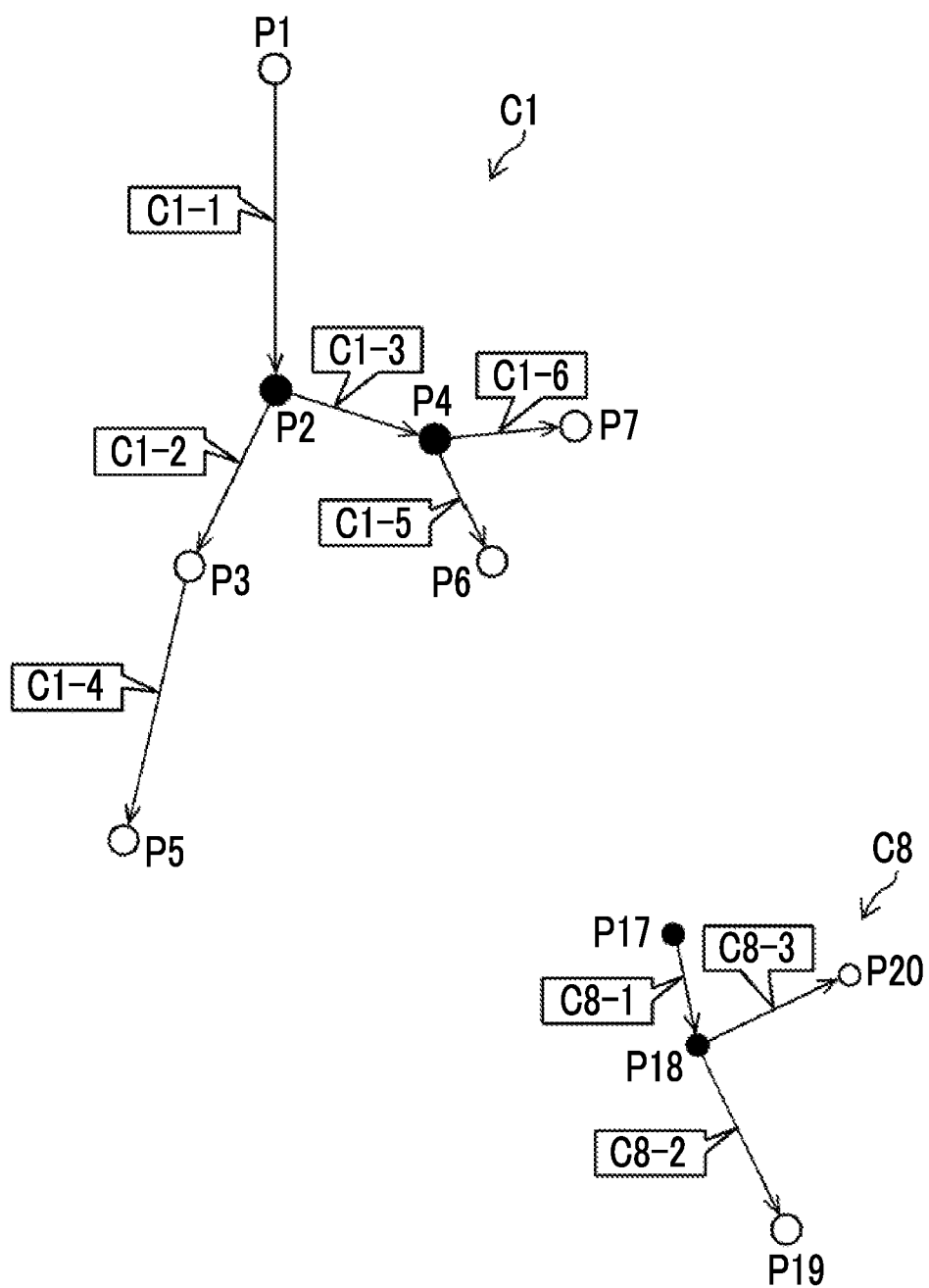
FIG. 27 is a diagram illustrating a display example in which the combination between the damage vectors of the labels of C1-5 and C8-1 is released as a result of performing the combination release instruction input.

FIG. 26 illustrates a manner in which the label of "C1-5+C8-1" corresponding to the combined damage vector is selected, and the release instruction input of the combination by the combined damage vector corresponding to the label. FIG. 27 illustrates a display example in which the combination between the damage vectors of labels of C1-5 and C8-1 is released as a result of performing the release instruction input of the combination. FIG. 28 is an updated example of the hierarchical structure information in which "0" is assigned to the add operation flag of the damage vectors corresponding to the labels of C1-5 and C8-1. The hierarchical structure information is updated such that the parent vector and child vector relationship between the damage vectors in which the combination is released is also deleted.

A label that can distinguish each damage vector after the combination release may be newly assigned instead of reassigning the same label as the label before being combined to each damage vector after the combination release. In order to perform the machine learning that combination between specific damage vectors is wrong and the combination is released manually, the same label as the label before being combined may be reassigned to each damage vector after the combination release.

A damage vector in which the combination is released is not limited to the damage vector manually designated. For example, it is possible to release the damage vector C5-2 that combines C3-1 and C4-1 by the method of connecting the damage vectors as illustrated in FIG. 8. In the case, the vector groups C3 and C4 before the combination and the previous labels C3-1 and C4-1 of the damage vectors that belong to the vector groups C3 and C4 are restored by selection of the label of the damage vector C5-2 and instruction of the combination release. In order to realize the above, the vector groups C3 and C4 and the labels C3-1 and C4-1 before executing the method of connecting the damage vectors are required to be recorded in the hierarchical structure information as a history before the connection.

(5) Display and selection of a label corresponding to a vector group, and deletion, combination, and release of the combination of the vector group corresponding to the selected label. It can be performed in the same manner as the display, selection, and the like of the label corresponding to individual damage vector.

As described above, according to the damage information processing device 100 and the method of processing damage information according to the embodiment, it is possible to easily grasp the connection relationship between the damage vectors and to easily analyze and/or search the damage vector by the hierarchical structure information.

Since it is possible to delete, combine, and release the combination of the damage vector by selecting the label, it is possible to easily edit the hierarchical structure information even though a position of a damage vector having a complicated shape is not accurately designated.

The examples of the present invention are described, but the present invention is not limited to the embodiment and the modification example described above and can be variously modified without departing from the spirit of the present invention.

For example, steps S100 to S150 can be executed by the Prim's algorithm which is an algorithm of an optimization problem for obtaining minimum spanning tree of weighted connected graph by graph theory other than the method described above.

That is, for example, it is assumed that a cost can be set between pixels of the detection result according to the idea of the graph theory. It is assumed that the cost is a calculation result using reference values such as direction, width, and distance of the damage vector (crack), and pixels with the smallest cost are connected. As a concept of the cost calculation, a calculation method can be considered such that the cost increases as the distance between the damage vectors increases, and the cost decreases as the direction between the damage vectors coincides with each other. In a case where the distance is far, but one crack-likeness is large by other references, it is possible to obtain a connection result reflecting the information. In a case where there are only pixels in the vicinity in which the cost between pixels is sufficiently large, it is not necessary to connect the damage vectors to each other. In a case where a shape may be bent at an unnatural angle (for example, acute angle of 90° or less) or an unnatural width difference may be generated (for example, step having width of five or more pixels is generated between connected damage vectors) as a result of the connection, a condition that does not connect the damage vectors may be set. In this manner, in a case where the distance between the damage vectors is small, the angle therebetween is small, and the width difference therebetween is small for the difference in distance, angle, and width between the damage vectors, it is possible to set the cost so as to be small.

Alternatively, in the case of extracting the damage vector by the Prim's algorithm, calculation reference values of the cost relating to distance, direction, and width of the damage vector may be changed according to the completion of the editing instruction input to correct extraction reference of the damage vector.

For example, in a case where delete operation flag "1" of the damage vector C5-2 is recorded by the delete operation to the damage vector C5-2 of FIG. 8, threshold values of the angle α1 and the angle α2 are reduced by a predetermined amount (for example, 5°). Accordingly, the cost relating to the direction between the damage vectors to be connected increases as an angle between the damage vectors is sharp.

Alternatively, as illustrated in FIG. 23, in a case where the direction between the damage vectors C1-5 and C8-1 belonging to different vector groups coincides with each other and the damage vectors are operated to connect to each other, a threshold value of the distance connecting the damage vectors in the same direction is increased by a predetermined amount (for example, ten pixels). Accordingly, the cost relating to the distance between the damage vectors in the same direction becomes small, and the damage vectors in the same direction are automatically connected easily even though the damage vectors are separated.

In addition, it is possible to extract one damage vector with high accuracy by a combination of a part or all of various kinds of machine learning such as the same neural network convergence calculation as JP2011-242365A, various methods such as the percolation method and the Kruskal's algorithm disclosed in JP2015-195769, or various methods such as the Prim's algorithm, the neural network convergence calculation, the percolation method, or the Kruskal's algorithm, or by one or more iterations of the combination of a part or all of the above.

EXPLANATION OF REFERENCES

1: bridge
2: floor slab
3: main girder
3A: joining part
100: damage information processing device
102: damage information acquisition unit
104: digital camera
106: image acquisition unit
108: image processing unit
110: damage vector generation unit
112: hierarchical structure information generation unit
114: damage vector extraction unit
116: hierarchical structure information recording unit
118: display unit 120: operation unit
S100: image input step
S110: damage extraction step
S120: damage vector generation step
S130: hierarchical structure information generation step
S140: display step
S150: recording step
S160: editing step

What is claimed is:

1. A crack information editing device comprising:
a crack information acquisition unit that acquires crack information on a crack of a structure detected by an image analysis of a surface image of the structure;
a labeling unit that assigns a label for identifying crack information based on the crack information acquired by the crack information acquisition unit;
a display unit that displays a video image indicating the crack information on the surface image in an overlapped manner and displays a video image indicating the label assigned by the labeling unit in association with the video image indicating the crack information;
a label selection unit capable of accepting selection of a predetermined label from among labels displayed by the display unit; and
a crack information editing unit that accepts editing of crack information associated with the label for which the selection by the label selection unit is accepted,
wherein the editing of the crack information accepted by the crack information editing unit includes combining a plurality of pieces of discontinuous crack information associated with a plurality of randomly selected labels into one continuous piece of crack information.

2. The crack information editing device according to claim 1,
wherein the display unit displays a video image indicating the label assigned by the labeling unit at a position outside the video image indicating the crack information.

3. The crack information editing device according to claim 1,
wherein the video image indicating the label is a balloon individually including a label for each of the crack information acquired by the crack information acquisition unit or a list table including a plurality of labels of the crack information acquired by the crack information acquisition unit.

4. The crack information editing device according to claim 1,
wherein the display unit highlights the video image of the crack information associated with the selected label.

5. The crack information editing device according to claim 1,
wherein the crack information acquisition unit acquires the crack information on the crack of the structure by at least one of Kruskal's algorithm, Prim's algorithm, neural network convergence calculation, or percolation method.

6. The crack information editing device according to claim 1,
wherein the crack information is vector data including a width, a length, and a direction of a crack.

7. The crack information editing device according to claim 1,
wherein the labeling unit updates the label of the crack information acquired by the crack information acquisition unit according to the editing of the crack information, and
the display unit updates the video image indicating the crack information and the video image indicating the label according to the editing of the crack information.

8. The crack information editing device according to claim 7,
wherein in a case where a combination between the plurality of pieces of crack information is accepted by the crack information editing unit,
the labeling unit assigns a common label to the plurality of pieces of crack information for which the combination is accepted, and
the display unit displays a video image indicating the common label in association with a video image indicating the combined plurality of pieces of crack information.

9. The crack information editing device according to claim 7,
wherein in a case where release of the combination between the plurality of pieces of crack information is accepted by the crack information editing unit,
the labeling unit assigns a label capable of distinguishing between the plurality of pieces of crack information for which the release of the combination is accepted from each other to each of the plurality of pieces of crack information, and
the display unit displays each of the distinguishable labels in association with a video image indicating each of the plurality of pieces of crack information.

10. A method of editing crack information that is executed by a computer, the method comprising:
acquiring crack information on a crack of a structure detected by an image analysis of a surface image of the structure;
assigning a label for identifying crack information based on the acquired crack information;
displaying a video image indicating the crack information on the surface image in an overlapped manner and displaying a video image indicating the assigned label in association with the video image indicating the crack information;
accepting selection of a predetermined label from among the displayed labels; and
accepting editing of crack information associated with the label for which the selection is accepted,
wherein the editing of the crack information includes combining a plurality of pieces of discontinuous crack information associated with a plurality of randomly selected labels into one continuous piece of crack information.

11. A non-transitory computer readable tangible medium having a crack information editing program for causing a computer to execute the method of editing crack information according to claim 10.

* * * * *